(12) United States Patent
Bogusky et al.

(10) Patent No.: US 10,690,260 B2
(45) Date of Patent: Jun. 23, 2020

(54) ADAPTER FOR BOTTOM OUTLET VALVE

(71) Applicant: Trinity Rail Group, LLC, Dallas, TX (US)

(72) Inventors: James A. Bogusky, Schwenksville, PA (US); Christopher Crisafulli, Mansfield, TX (US); Samuel Nash, Dallas, TX (US); Dipen K. Shah, Plano, TX (US)

(73) Assignee: Trinity Rail Group, LLC, Dallas, TX (US)

( * ) Notice: Subject to any disclaimer, the term of this patent is extended or adjusted under 35 U.S.C. 154(b) by 0 days.

(21) Appl. No.: 16/051,085

(22) Filed: Jul. 31, 2018

(65) Prior Publication Data

US 2020/0041032 A1 Feb. 6, 2020

(51) Int. Cl.
| | |
|---|---|
| *F16K 31/53* | (2006.01) |
| *F16K 31/60* | (2006.01) |
| *B65D 90/00* | (2006.01) |
| *F16K 35/06* | (2006.01) |
| *F16K 35/02* | (2006.01) |
| *F16K 1/16* | (2006.01) |
| *B61D 5/00* | (2006.01) |

(52) U.S. Cl.
CPC ............ *F16K 31/535* (2013.01); *B61D 5/008* (2013.01); *B61D 5/08* (2013.01); *F16K 1/16* (2013.01); *F16K 31/602* (2013.01); *F16K 35/02* (2013.01); *F16K 35/06* (2013.01)

(58) Field of Classification Search
CPC ......... B61D 5/00; B61D 5/008; F16K 31/535; Y10T 137/5109
USPC .............................................. 251/248, 250.5
See application file for complete search history.

(56) References Cited

U.S. PATENT DOCUMENTS

| | | | | |
|---|---|---|---|---|
| 2,092,926 A | * | 9/1937 | Lithgow ................ | B61D 5/008 137/241 |
| 3,227,101 A | * | 1/1966 | Holden, Jr. ............. | F16K 31/52 105/358 |
| 3,591,131 A | * | 7/1971 | Carlson .................. | B61D 5/008 251/144 |
| 4,212,447 A | | 7/1980 | Behle | |
| 4,527,489 A | * | 7/1985 | Schlink ................... | B61D 5/08 105/358 |
| 4,678,159 A | * | 7/1987 | Gardner .................. | F16K 27/07 251/101 |

(Continued)

FOREIGN PATENT DOCUMENTS

| | | | | |
|---|---|---|---|---|
| CA | 2 949 530 | | 5/2017 | |
| DE | 1149585 B | * | 5/1963 | ............ B61D 5/008 |

OTHER PUBLICATIONS

Machine Translation DE 1149585.*

*Primary Examiner* — Kevin F Murphy
(74) *Attorney, Agent, or Firm* — Baker Botts, LLP

(57) ABSTRACT

According to certain embodiments, an adapter assembly for a bottom outlet valve comprises an apparatus configured to be coupled to a stem of the bottom outlet valve of the railroad car. The stem of the bottom outlet valve is aligned generally with a longitudinal axis of the railroad car. The apparatus comprises a coupler configured to be coupled to the stem of the bottom outlet valve and a primary gear coupled to the coupler. The primary gear is configured to be coupled to a handle assembly extending from either side of the railroad car. The handle assembly is configured to operate the bottom outlet valve.

15 Claims, 21 Drawing Sheets

(56) References Cited

U.S. PATENT DOCUMENTS

| | | | |
|---|---|---|---|
| 4,941,410 A | 7/1990 | Dalrymple et al. | |
| 8,113,229 B2* | 2/2012 | Bosma | B60H 1/3421 |
| | | | 137/353 |
| 9,234,606 B2* | 1/2016 | Bock-Aronson | E03C 1/0412 |
| 9,694,828 B2 | 7/2017 | Saxton et al. | |
| 9,746,873 B2 | 8/2017 | Thompson et al. | |
| 9,828,006 B2 | 11/2017 | Thompson et al. | |
| 9,909,683 B2* | 3/2018 | Morin | F16H 55/26 |
| 2015/0369390 A1 | 12/2015 | Dzolovic et al. | |
| 2016/0075347 A1 | 3/2016 | Thompson et al. | |

* cited by examiner

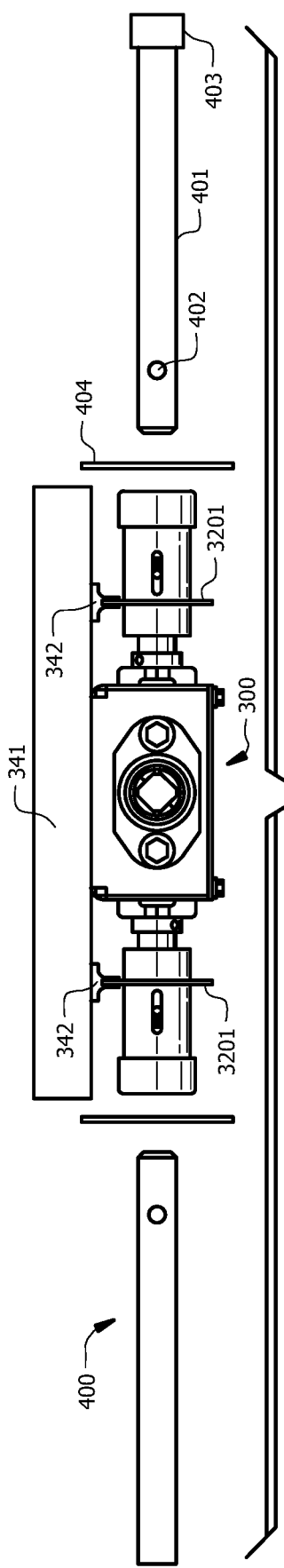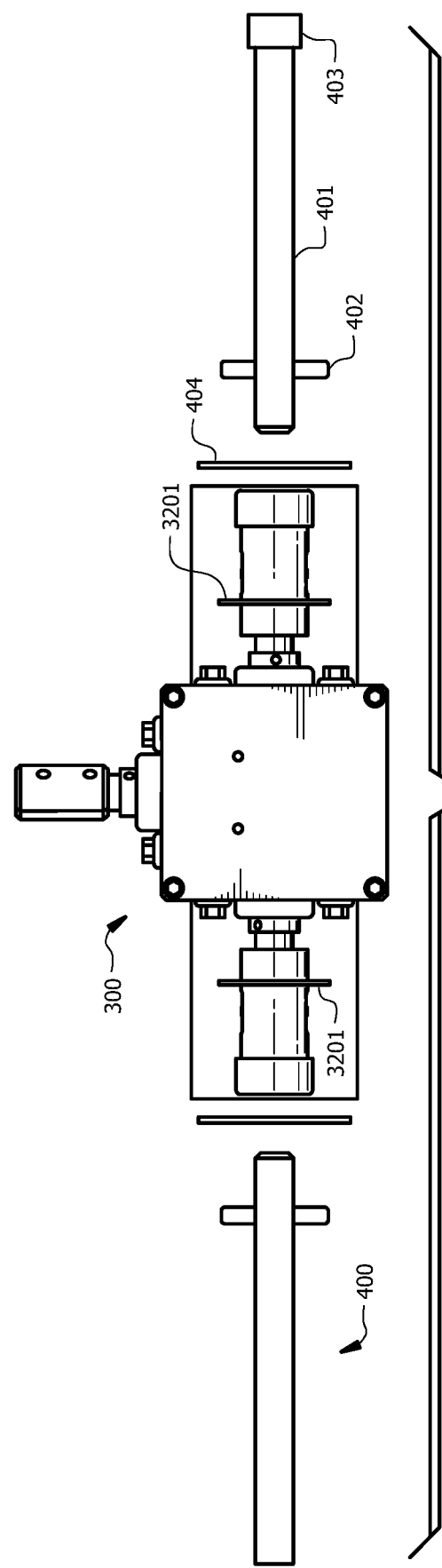

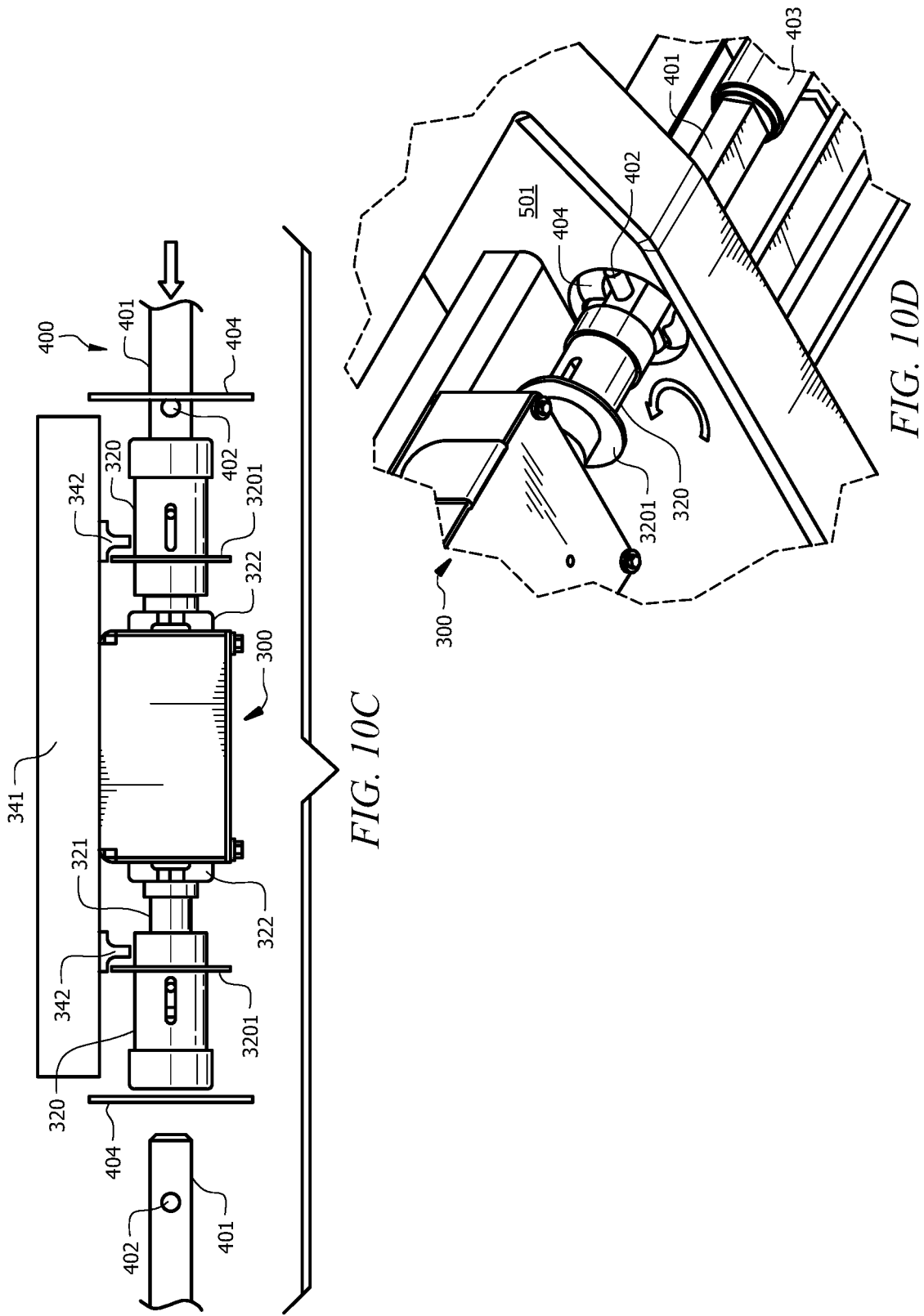

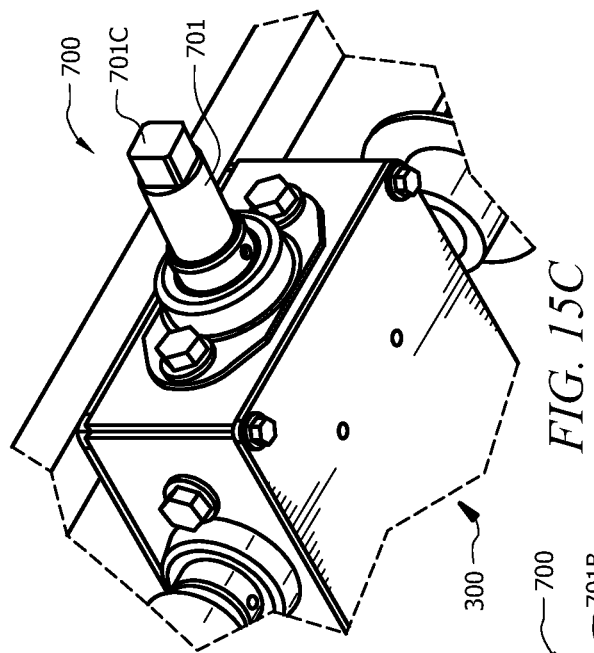
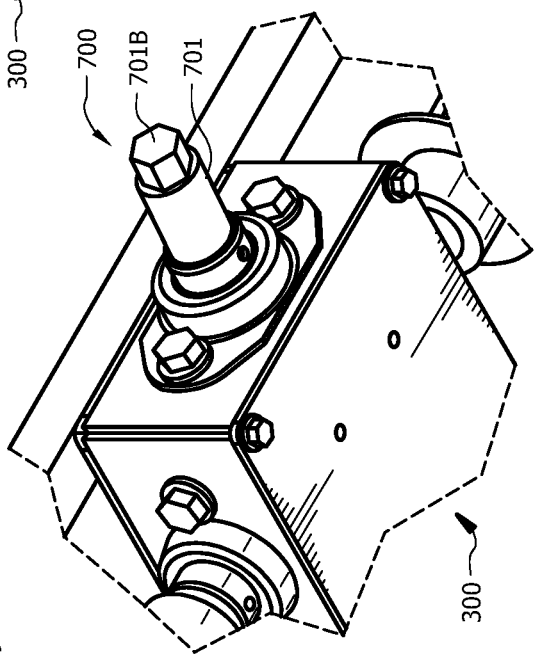
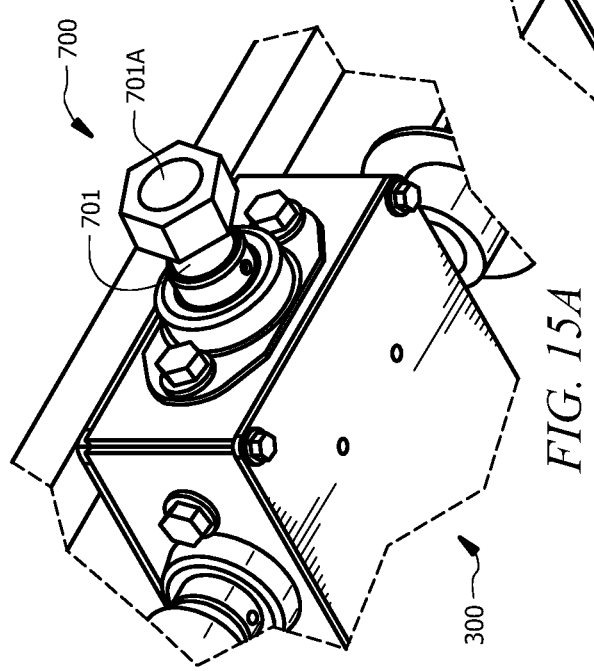
FIG. 15A
FIG. 15B
FIG. 15C

ADAPTER FOR BOTTOM OUTLET VALVE

TECHNICAL FIELD

Particular embodiments relate generally to liquid cargo transport vehicles, and more particularly to a dual side adapter for a bottom outlet valve (BOV) used in railcars, such as railroad tank cars for transporting liquids.

BACKGROUND

Railroad cars transport and sometimes store liquids, fluids, gaseous commodities, and any types of liquid materials which may be satisfactorily unloaded through a bottom outlet valve underneath a tank of the railroad cars. Bottom outlet valves are typically mounted at the bottom center line of the tank and are typically operated by turning a single stem of the bottom outlet valve, such that the stem is operated from one of the lateral sides of the tank.

SUMMARY

To address the foregoing problems with existing solutions, disclosed is a dual-sided adapter assembly.

According to some embodiments, the adapter assembly for a bottom outlet valve comprises an apparatus configured to be coupled to a stem of the bottom outlet valve of the railroad car. The apparatus comprises a coupler configured to be coupled to the stem of the bottom outlet valve and a primary gear coupled to the coupler. The primary gear is configured to be coupled to a handle assembly extending from either side of the railroad car. The handle assembly is configured to operate the bottom outlet valve.

According to another embodiment, the adapter assembly for a bottom outlet valve comprises an apparatus configured to be coupled to a stem of the bottom outlet valve of the railroad car, wherein the stem of the bottom outlet valve is aligned generally with a longitudinal axis of the railroad car. The apparatus comprises a coupler configured to be coupled to the stem of the bottom outlet valve and a primary gear coupled to the coupler. The primary gear is configured to be coupled to a handle assembly extending from either side of the railroad car. The handle assembly is configured to operate the bottom outlet valve.

In particular embodiments, the apparatus further comprises two secondary gears coupled to the primary gear and two shafts aligned generally perpendicular to a longitudinal axis of the railroad car. In particular embodiments, each of the two shafts is coupled to a respective one of the two secondary gears. The handle assembly is configured to be coupled to either of the two shafts.

In particular embodiments, the handle assembly comprises a handle assembly gear which is configured to operate the primary gear.

In particular embodiments, the apparatus further comprises an idler gear coupled to at least one of the two secondary gears and an idler shaft configured to be coupled to the idler gear. The idler shaft is configured to be coupled to a tool.

In particular embodiments, the adapter assembly further comprises a skid which is configured to at least partially cover the apparatus.

According to some embodiments, a method for coupling an adapter assembly to a bottom outlet valve may comprise mounting the bottom outlet valve underneath a railroad car. The method further comprises aligning a stem of the bottom outlet valve generally with a longitudinal axis of the railroad car. The method further comprises coupling the adapter assembly described herein to the bottom outlet valve. The adapter assembly comprises a coupler configured to be coupled to the stem of the bottom outlet valve and a primary gear coupled to the coupler. The primary gear is configured to be coupled to a handle assembly extending from either side of the subject. The handle assembly is configured to operate the bottom outlet valve.

Particular embodiments of the present disclosure may provide numerous technical advantages. For example, liquids carried by railroad cars are unloaded from the bottom of a tank via a bottom outlet valve typically. The bottom outlet valve (BOV) may be opened or closed manually or with the aid of externally applied mechanical tools via turning a stem of the BOV. Conventionally, the stem of the BOV is mounted aligning with the lateral axis of the railroad cars, so that a user operates the BOV by attaching a handle assembly to the stem of BOV from only one lateral side of the railroad cars. Particular embodiments of the present disclosure may provide a capability for the user to operate the BOV from either lateral side of railroad cars. Furthermore, particular embodiments of the present disclosure improve the efficiency to unload the liquids from the tank and reduce safety incidents by limiting the chances of users traveling across the railroad cars.

BRIEF DESCRIPTION OF THE DRAWINGS

For a more complete understanding of the particular embodiments, and the advantages thereof, reference is now made to the following written description taken in conjunction with the accompanying drawings, in which:

FIG. 8A is a schematic drawing illustrating a front view of an exemplary adapter assembly, according to a particular embodiment;

FIG. 8B is a schematic drawing illustrating a bottom view of an exemplary adapter assembly, according to a particular embodiment;

FIG. 10C is a schematic drawing illustrating a partial rear view of an exemplary adapter assembly during operation, according to a particular embodiment;

FIG. 10D is a schematic drawing illustrating a partial perspective view an exemplary adapter assembly during operation, according to a particular embodiment;

FIG. 15A is a schematic drawing illustrating a perspective view of an exemplary idler shaft, according to a particular embodiment;

FIG. 15B is a schematic drawing illustrating a perspective view of an exemplary idler shaft, according to a particular embodiment;

FIG. 15C is a schematic drawing illustrating a perspective view of an exemplary idler shaft, according to a particular embodiment;

DETAILED DESCRIPTION

Railroad cars generally include one or more tanks which may hold liquids, fluids, and any types of liquid materials satisfactorily unloaded through a bottom outlet valve mounted underneath the tank. The bottom outlet valve is typically provided at or near the bottom of each tank to rapidly unload the liquids. A variety of adapter assemblies along with various operating mechanisms are used to open and close the bottom outlet valve associated with the tank of the railroad cars.

Figure 1:
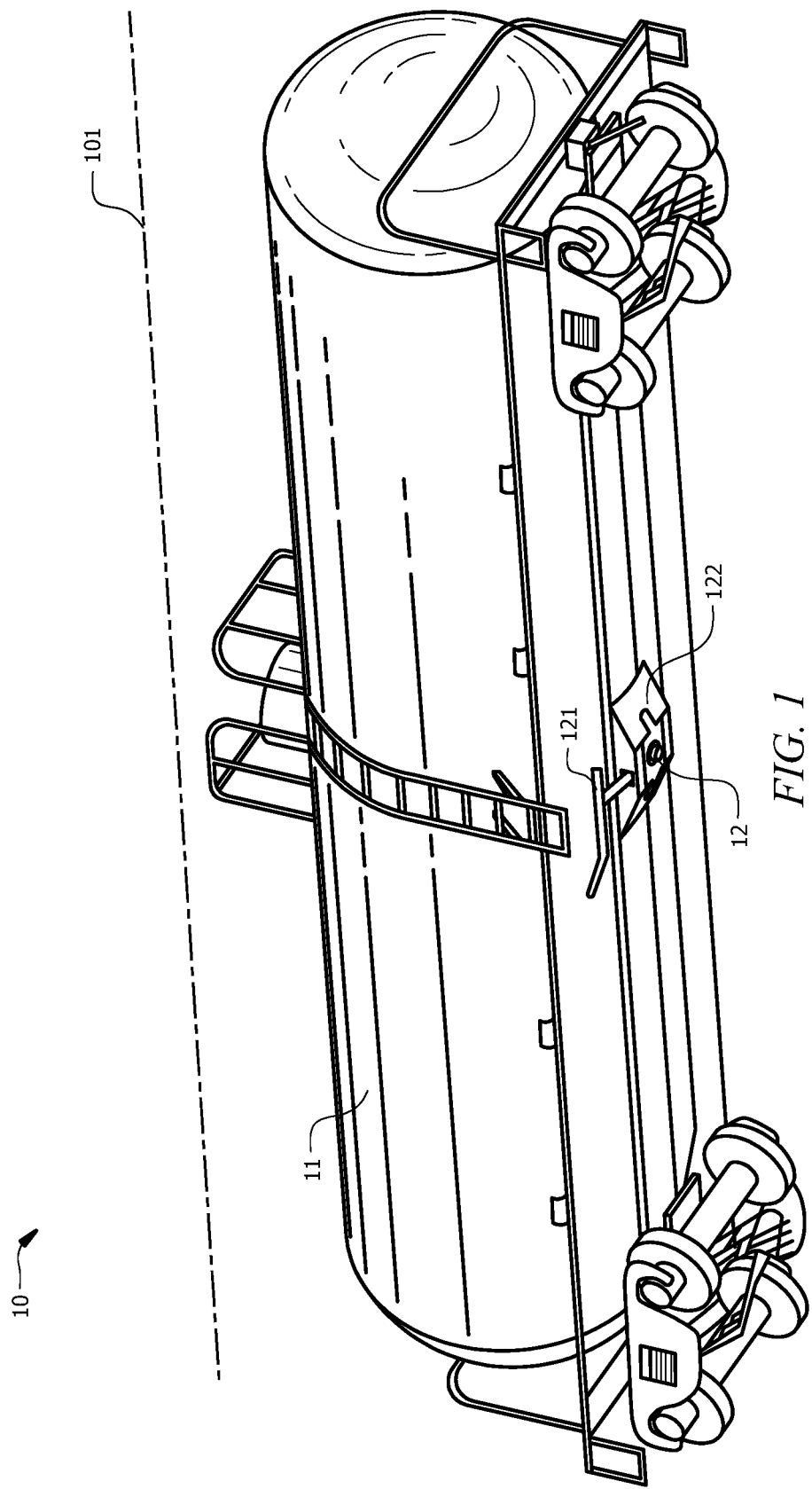
FIG. 1 is a schematic drawing showing a perspective view of an example railroad car with a bottom outlet valve mounted underneath.
Figure 2A:
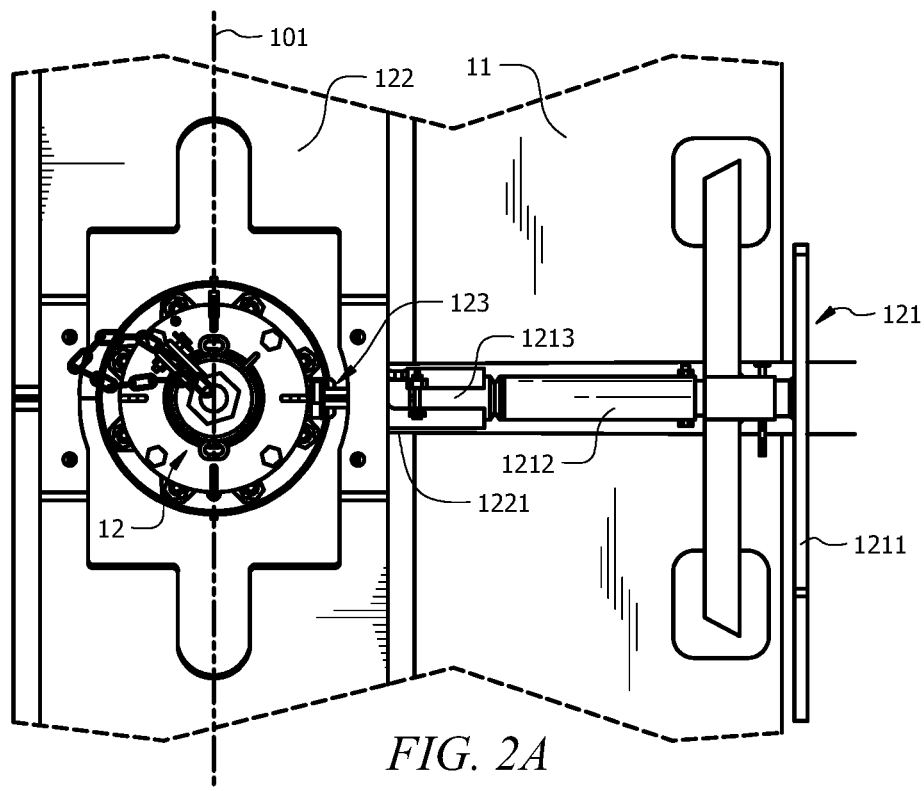
FIG. 2A is a schematic drawing illustrating a bottom view of a bottom outlet valve and a handle assembly, according to the prior art.
Figure 2B:
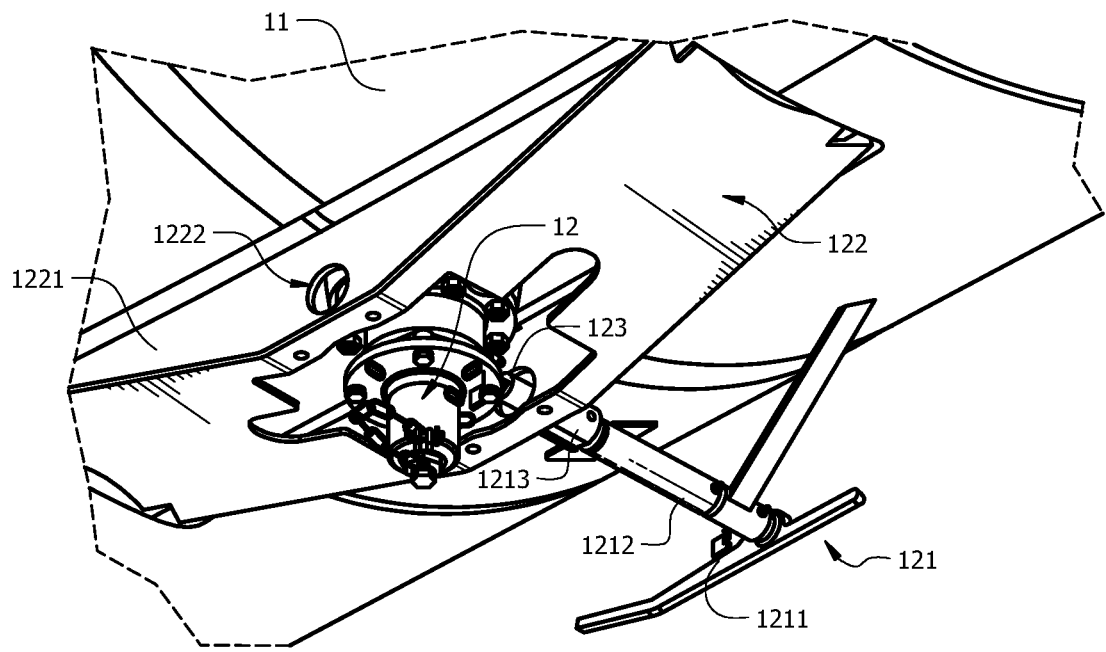
FIG. 2B is a schematic drawing illustrating a perspective view of the bottom outlet valve and the handle assembly, according to the prior art.

FIG. 1 illustrates a railroad car 10. Railroad car 10 has a tank 11 which stores liquids therein. The tank 11 has a bottom outlet valve (BOV) 12 underneath to unload the liquids. The bottom outlet valve 12 illustrated in FIGS. 1, 2A and 2B can be of a variety of types and is typically mounted at the bottom center line of the tank 11. Railroad car has a longitudinal axis 101. FIGS. 1, 2A and 2B show a bottom outlet valve 12 with a one-sided handle assembly 121. A skid 122 covers the bottom outlet valve 12.

In FIGS. 2A and 2B, the bottom outlet valve 12 has one stem 123 which is oriented transversely and can be linkagely connected to a handle assembly 121. The step 123 is aligned perpendicular to the longitudinal axis 101 of the railroad car. The stem 123 of the BOV can only be operated by the handle assembly 121 from one of lateral side of the railroad cars to open or to close the BOV 12. The one-sided handle assembly 121 comprises a handle 1211, a shaft 1212 and a coupler 1213. The shaft 1212 is attached to the coupler 1213 at one end of the shaft 1212 and is attached to the handle 1211 at the other end of the shaft 1212. When a user engages the handle assembly 121, the user rotates the handle 1211 and the rotation motion translates from the handle 1211 to the stem 123 via the coupler 1213 of the BOV 12 to open or close the BOV 12.

However, the user may only operate the BOV 12 from one side of the railroad car. When the user is on the opposite side of the railroad car from the stem 123 of the BOV 12, it is time-consuming and inconvenient to travel to the other side of the railroad car, because a railroad car typically has multiple tanks linked with each other forming a long longitudinal length of the railroad car. It is also dangerous for the user to travel around or under the railroad car to get over to the other side of the railroad car. Furthermore, it may not be cost efficient to have two stems 123 installed on both lateral sides of the BOV 12 so that the user may operate the BOV 12 from both sides of the railroad car. In addition, a BOV having two stems increases the risk of leaking.

To address the problems discussed above, particular embodiments include a dual side adapter assembly with a mechanism capable of operating an existing BOV independently from either side of the railroad car. In particular embodiments the BOV may be mounted such that the BOV stem points along the longitudinal axis of the railroad car. A gearbox in the adapter assembly is used to be coupled to the stem of the BOV while maintaining a locked state when resting or disengaged.

Figure 3A:
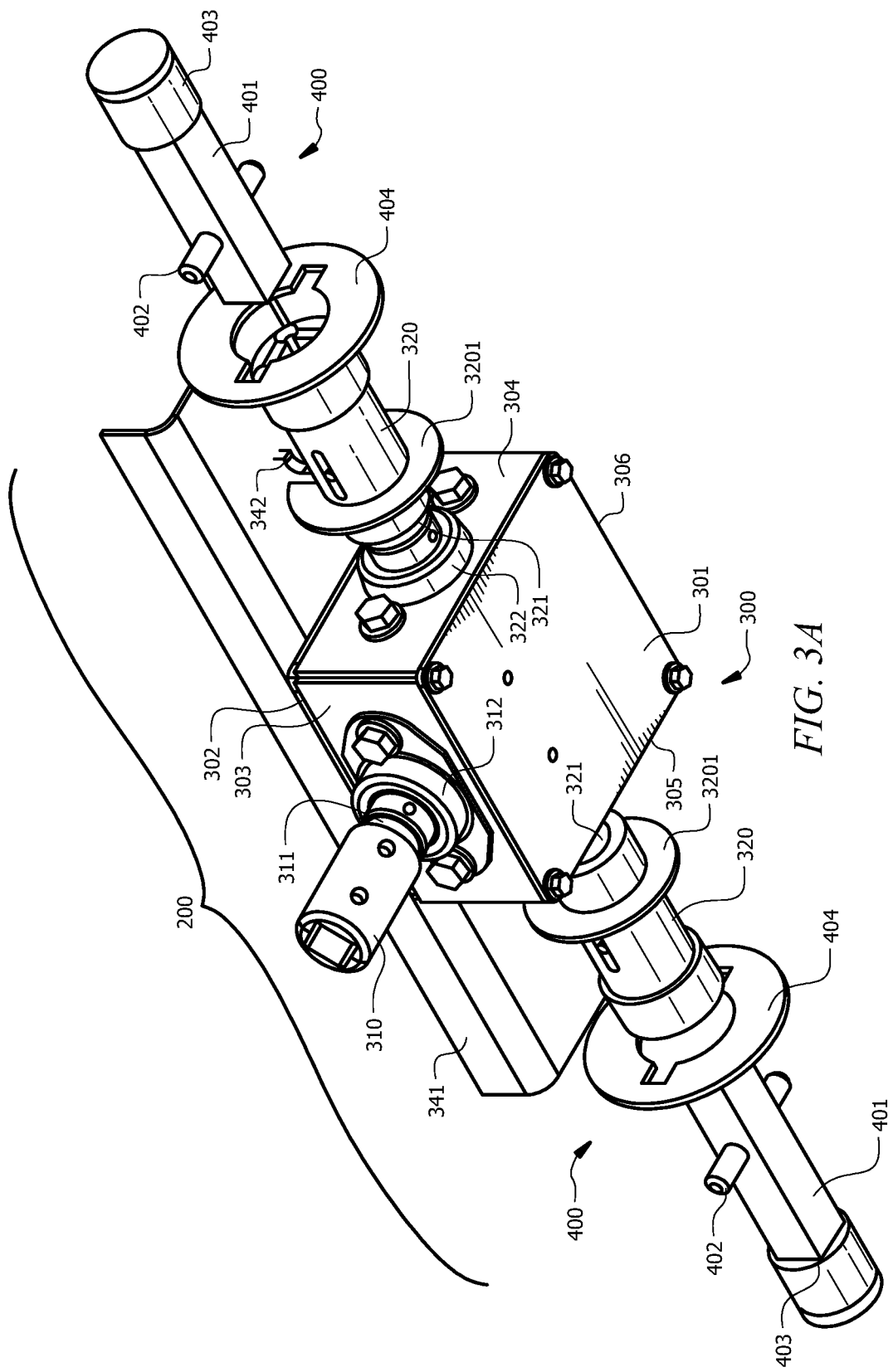
FIG. 3A is a schematic drawing illustrating a perspective view of an exemplary adapter assembly, according to a particular embodiment.
Figure 3B:
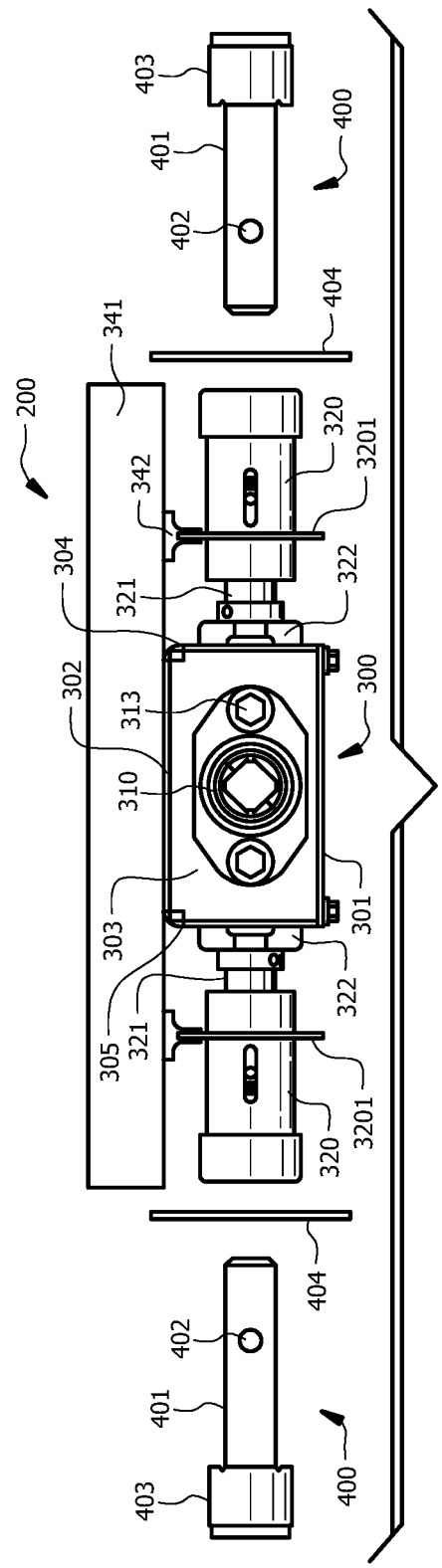
FIG. 3B is a schematic drawing illustrating a front view of an exemplary adapter assembly, according to a particular embodiment.
Figure 3C:
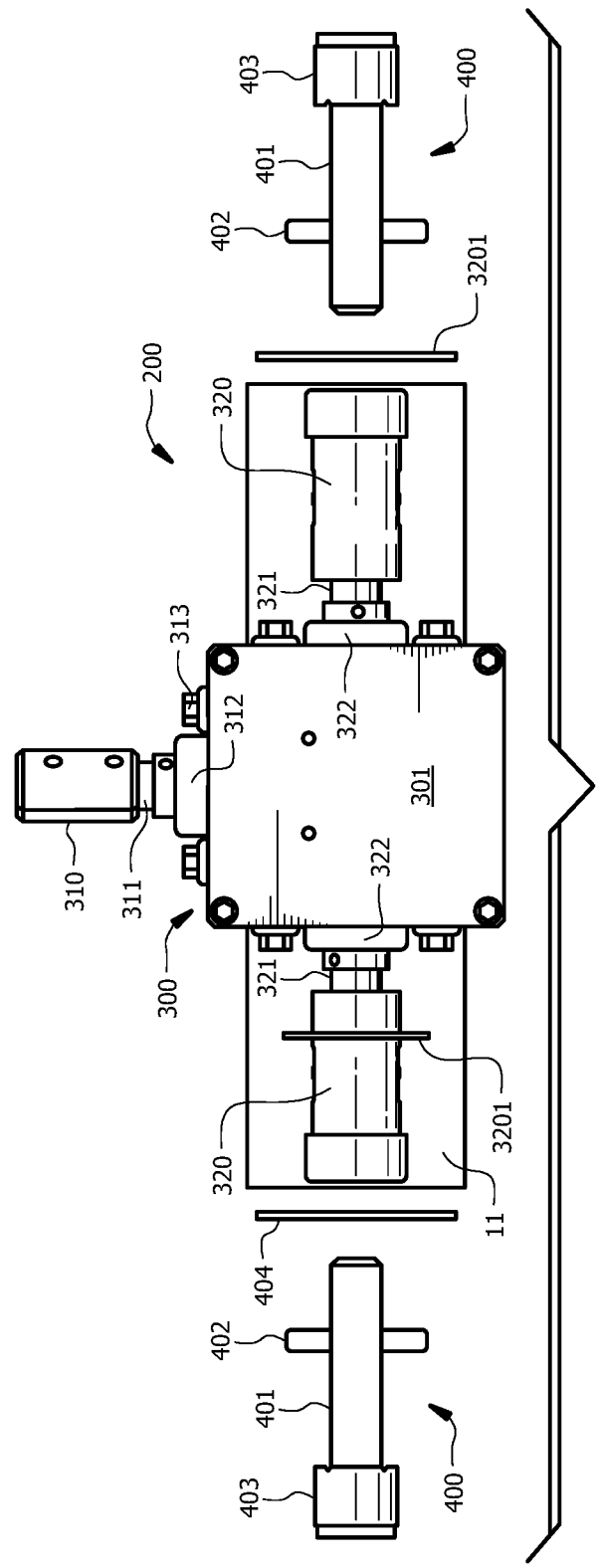
FIG. 3C is a schematic drawing illustrating a bottom view of an exemplary adapter assembly, according to a particular embodiment.

FIG. 3A, FIGS. 3B and 3C are schematic drawings illustrating a dual side BOV adapter assembly 200 from a perspective view, a front view and a bottom view, respectively, in accordance with a particular embodiment. Adapter assembly 200 shown in particular embodiments comprises a gearbox 300 and two keyed shafts 400. In some embodiments, the adapter assembly 200 does not have two keyed shafts 400. The gearbox 300 has a bottom cover plate 301, an upper cover plate 302, a first wall 303, a second wall 304, a third wall 305, and a fourth wall 306. The first wall 303 and the fourth wall 306 are positioned oppositely, and the second wall 304 and the third wall 305 are positioned oppositely. The first wall 303 and the fourth wall 306 are positioned between the second wall 304 and the third wall 306. Upper cover plate 302 is positioned on top of the first wall 303, the second wall 304, the third wall 305 and the fourth wall 306; and bottom cover plate 301 is positioned underneath the first wall 303, the second wall 304, the third wall 305 and the fourth wall 306 to form a case of the gearbox 300.

Adapter assembly 200 includes a primary shaft 311 rotatably mounted through the first wall 303 using a bearing 312. A first coupler 310 is mounted at an outer end of the primary shaft 311. In a particular embodiment, the first coupler 301 may be a BOV stem clamshell coupler. In a particular embodiment, the BOV stem clamshell coupler may be modified to any other stem connection. Two secondary shafts 321 are mounted through the second wall 304 and the third wall 305 respectively using a bearing 322. A second coupler 320 is mounted at an outer end of the secondary shaft 321 and is movable along the secondary shaft 321. In a particular embodiment, the second coupler 320 may be a rotating coupler. The second coupler 320 has a protruding part 3201 on an outer rim of the second coupler 320. In a particular embodiment, the protruding part 3201 may be a disk lock with a slot or any other lugs which can provide a temporary position for the second coupler 320. In certain embodiments, the bearings 312, 322 may be mounted using bearing mounting bolts or any other means to be mounted on the walls of the gearbox 300. In a particular embodiment, the bearings 312, 322 may be pressed fit. In a particular embodiment, the upper cover plate 302 of the gearbox 300 may be attached to a mounting channel 341 or any other mechanism of mounting to a skid mounted underneath the tank. In a particular embodiment, the upper cover plate 302 may function as the mounting channel 341. In a particular embodiment, mounting channel bolts may be used to attach the gearbox 300 to the mounting channel 341. In some embodiments, the mounting channel 341 has two stoppers 342 which are each positioned corresponding to a protruding part 3201 of a second coupler 320. In a particular embodiment, the stopper 342 may be a locking tab or any other component which can stop the protruding part 3201 of the second coupler 320 from rotating.

The keyed shaft 400 has a column body 401, a protruding part 402, a coupler 403, and a plate 404. The coupler 403 is mounted at one end of the column body 401, and the other end of the column body 401 is shaped correspondingly to the second coupler 320. The keyed shaft 400 may attach to the second coupler 320 to operate the gearbox 300. The protruding part 402 is positioned on an outer rim of the column body 401, and the plate 404 may be mounted on a skid. Plate 404 has an opening configured to allow the protruding part 402 to go through it. In a particular embodiment, the protruding part 402 may be a key lug, and the opening of the plate 404 may be a slot which is sized corresponding to the key lug.

Figure 4:
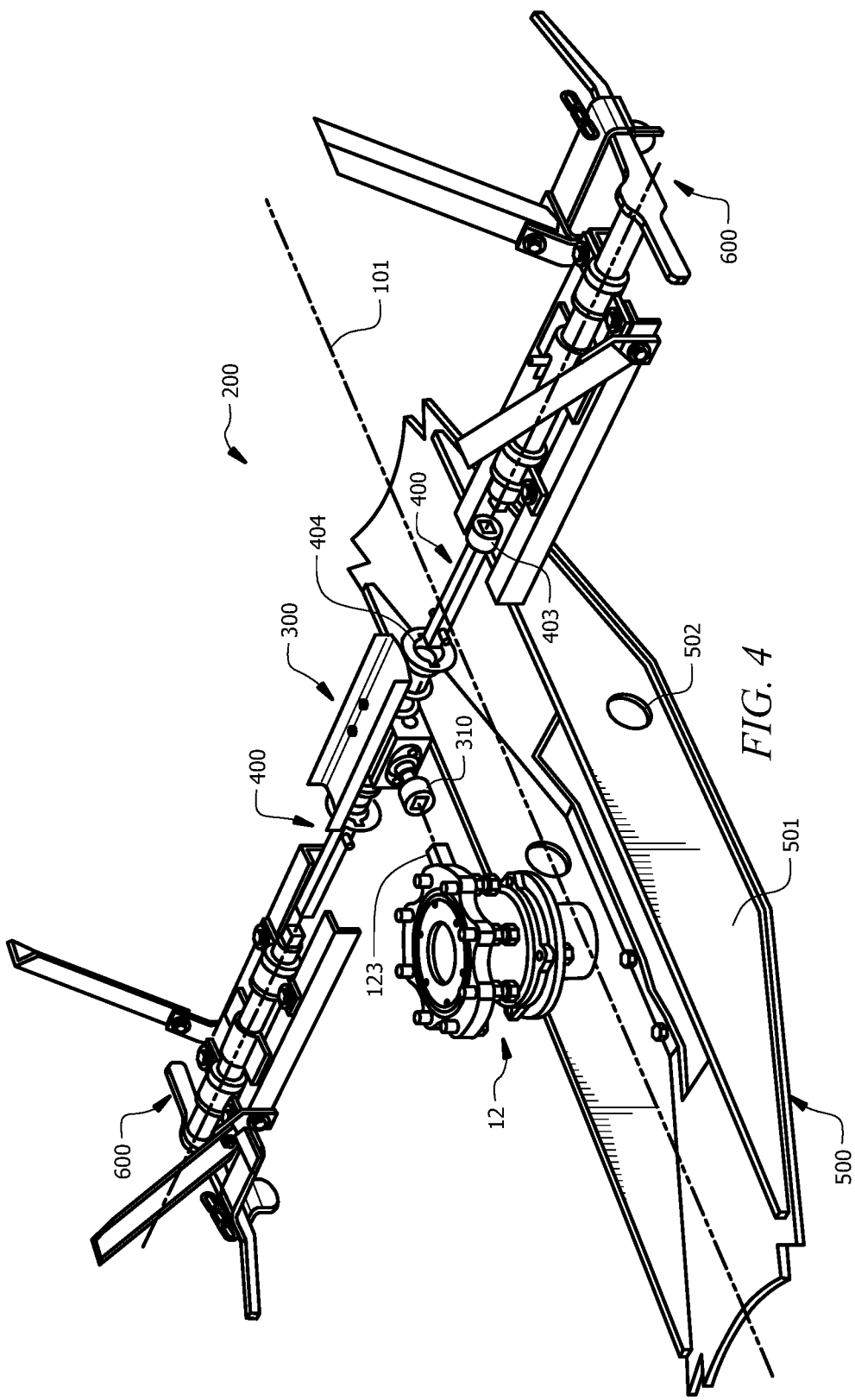
FIG. 4 is a schematic drawing illustrating an exploded perspective view of the BOV and an exemplary adapter assembly, according to a particular embodiment.

FIG. 4 is a schematic drawing illustrating an exploded perspective view of the BOV 12 and the adapter assembly 200, in accordance with a particular embodiment. FIG. 4 also illustrates the gearbox 300, two keyed shafts 400, the skid 500 and two handle assemblies 600. The BOV 12 is mounted inside of the skid 500, and the stem 123 is aligned with the longitudinal axis 101 of the railroad car. In some embodiments, the stem 123 of the BOV 12 is parallel with longitudinal axis 101 of the railroad car. In a particular embodiment, the stem 123 may be built with a 7/8" square shaft end. The gearbox 300 may attach to the stem 123 of the BOV 12 via the first coupler 310. In some embodiments, the BOV 12 and the gearbox 300 are inside a protected space of the skid 500. The skid 500 includes two skid webs 501 as two side walls, and the skid web 501 comprises a through hole 502 which is sized to place the plate 404 of the keyed shaft 400.

The handle assembly 600 may attach to the keyed shaft 400 via the couple 403 of the keyed shaft 400. A user may operate the BOV 12 using the handle assembly 600 and the keyed shaft 400 from either side of the tank. In some embodiments, the keyed shaft 400 and the handle assembly 600 may be positioned by a rack mounted underneath the tank. In a particular embodiment, the keyed shaft 400 and the handle assembly 600 are not installed underneath the tank during shipment or movement of the railroad car. For example, when a user needs to operate the BOV 12, he/she may insert a handle assembly 600 into the plate 404 and turn it thereby opening or closing the BOV 12. A handle assembly 600 may be inserted on either side of the railroad car such that the BOV may be opened or closed from either side. Detailed descriptions of the handle assembly 600 are further disclosed with respect to FIG. 8D.

Figure 5:
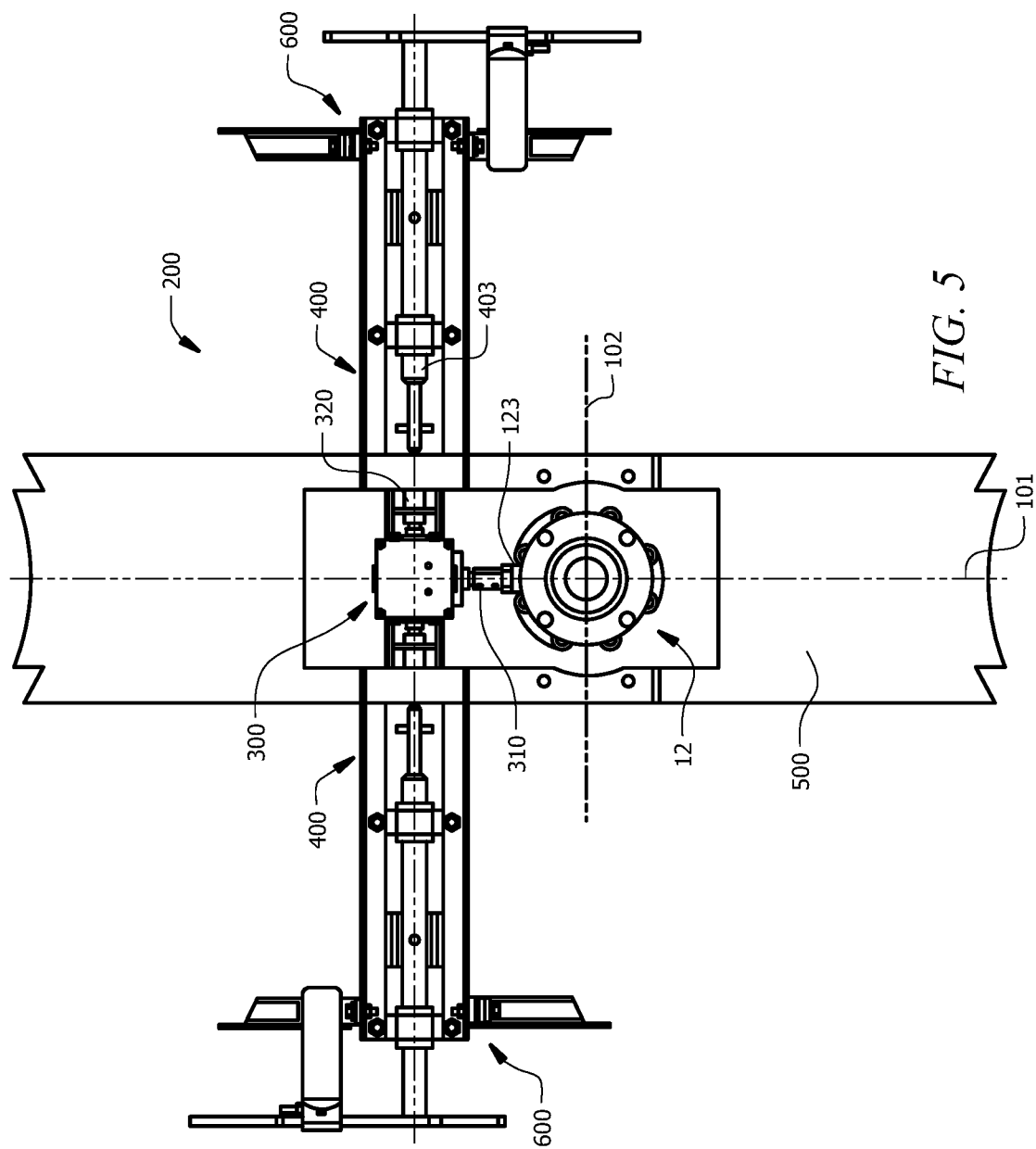
FIG. 5 is a schematic drawing illustrating a bottom view of the BOV and an exemplary adapter assembly, according to a particular embodiment.

FIG. 5 is a schematic drawing illustrating a bottom view of the BOV 12 and the adapter assembly 200, in accordance with a particular embodiment. FIG. 5 also illustrates the gearbox 300, the keyed shafts 400, the skid 500 and the handle assemblies 600 when they are mounted underneath the tank, in accordance with a particular embodiment. In FIG. 5, the gearbox 300 attaches to the stem 123 of the BOV 12 via the first coupler 310, and the skid 500 covers the gearbox 300 and the BOV 12 therein. In some embodiments, the adapter assembly 200 may be located centrally between two handle assemblies 600. In some embodiments, the first coupler 310 may be aligned with the longitudinal axis 101 of the railroad car. In some embodiments, the first coupler 310 may be aligned with the BOV stem axis. In some embodiments, the first coupler 310 may be perpendicular to a cross axis 102 of the BOV 12. In some embodiments, the second coupler 320 may be aligned with the cross axis of the adapter assembly 200. While shown on both sides of the adapter assembly 200 in FIG. 5, the handle assembly 600 in operation may be attached to the keyed shaft 400 on either side of the tank. An end of the keyed shaft 400 is aligned with the second coupler 320 of the gearbox 300.

Figure 6A:
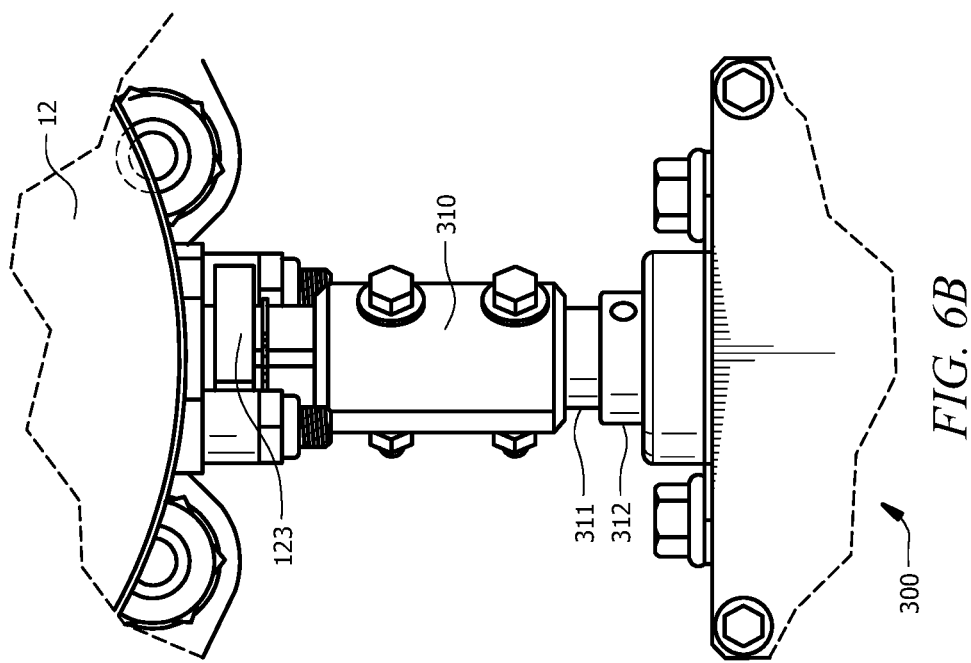
FIG. 6A is a schematic drawing illustrating a perspective view of an exemplary first coupler of the gearbox and the stem of the BOV, according to a particular embodiment.
Figure 6B:
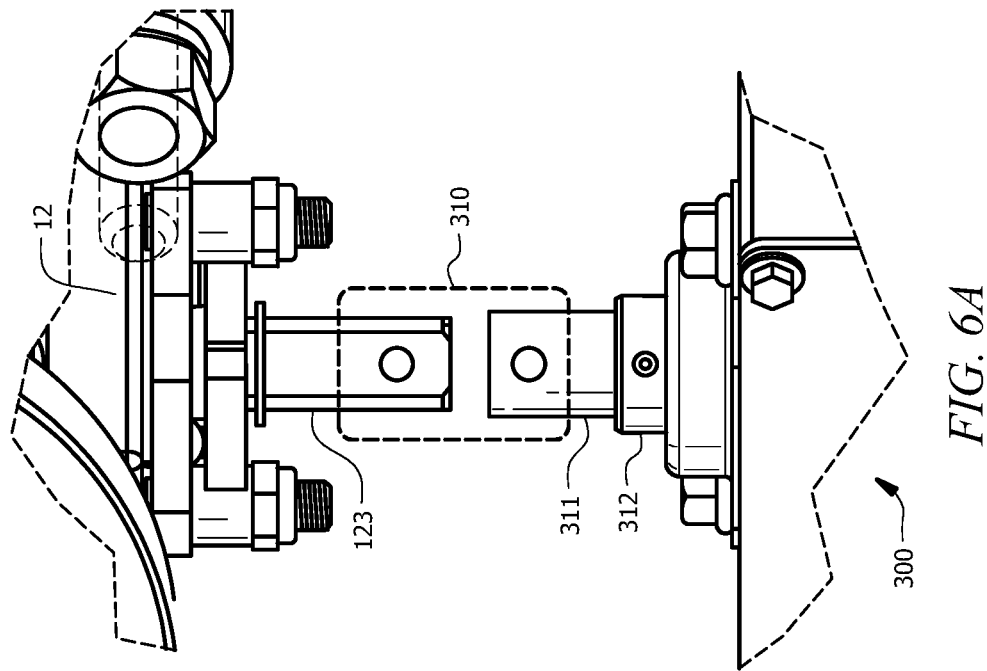
FIG. 6B is a schematic drawing illustrating a bottom view of an exemplary first coupler of the gearbox and the stem of the BOV, according to a particular embodiment.

FIG. 6A is a schematic drawing illustrating the first coupler 310 of the gearbox 300 approaching to the stem 123 of the BOV 12, in accordance with a particular embodiment. FIG. 6B is a schematic drawing illustrating the first coupler 310 of the gearbox 300 coupling to the stem 123 of the BOV 12, in accordance with a particular embodiment. In FIG. 6A, the first coupler 310 has two opposite openings to attach to the stem 123 of the BOV 12 and the primary shaft 311 of the gearbox 300 separately. In FIG. 6B, the first coupler 310 of the gearbox 300 engages to the stem 123 of the BOV 12. Through the motion of the primary shaft 311 of the gearbox 300, the stem 123 of the BOV 12 may be opened or closed via a translation of the motion from the primary shaft 311 through the first coupler 310 to the stem 123.

Figure 7A:
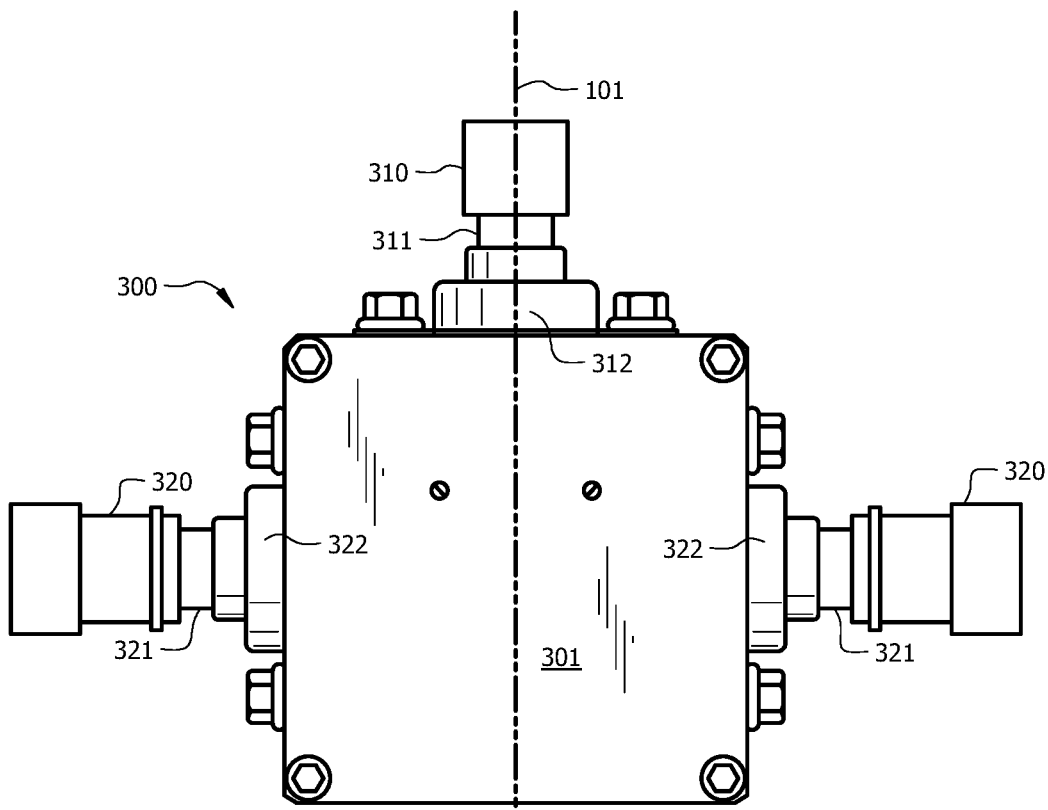
FIG. 7A is a schematic drawing illustrating a bottom view of an exemplary adapter assembly, according to a particular embodiment.
Figure 7B:
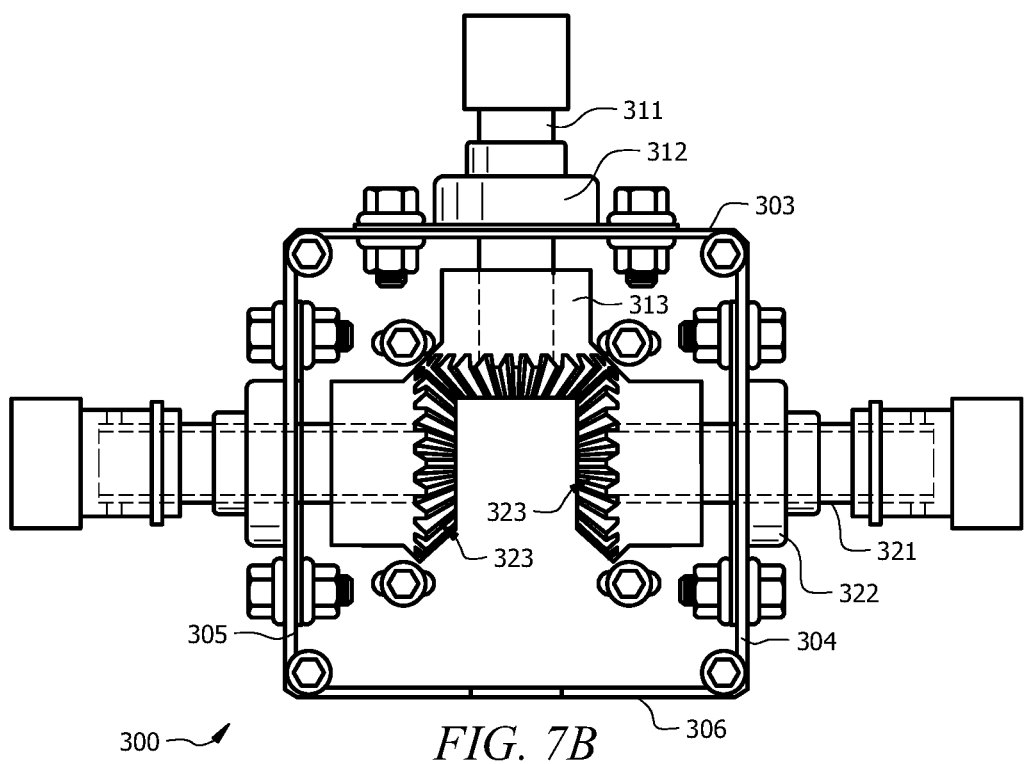
FIG. 7B is a schematic drawing illustrating a partial cutaway view of an exemplary adapter assembly, according to a particular embodiment.

FIG. 7A is a schematic drawing illustrating a bottom view of the gearbox 300, in accordance with a particular embodiment. FIG. 7B is a schematic drawing illustrating inside of the gearbox 300 from its bottom view, in accordance with a particular embodiment. In FIG. 7A, the primary shaft 311 is aligned with the stem axis of the BOV, and two secondary shafts 321 are aligned generally perpendicular to the longitudinal axis 101 of the railroad car. The bottom cover plate 301 keeps the gearbox 300 from collecting external debris and is closed using cover plate bolts or any fasteners that may mount the bottom cover plate 301 to the gearbox 300.

In FIG. 7B, the primary shaft 311 is mounted through a wall of the gearbox 300 using the bearing 312 to provide the primary shaft 311 the capability to rotate. The primary shaft 311 attaches to a primary gear 313 with one end of the primary shaft 311 inside the gearbox 300. Two secondary shafts 321 are mounted through two side walls of the gearbox 300 using two bearing 322 respectively to provide the secondary shafts 321 the capability to rotate. The two secondary shafts 321 attach to two secondary gears 323 with one end of the secondary shaft 321 inside the gearbox 300 respectively. In some embodiments, the primary gear 313 faces to the first wall 303 and the two secondary gears 323 face the second wall 304 and the third wall 305 respectively. The primary gear 313 is linkagely connected to the two secondary gears 323, which may translate the motion from the secondary shaft 321 to the primary shaft 311. In certain embodiments, the primary gear and the secondary gear may be beveled gears.

Figure 8C:
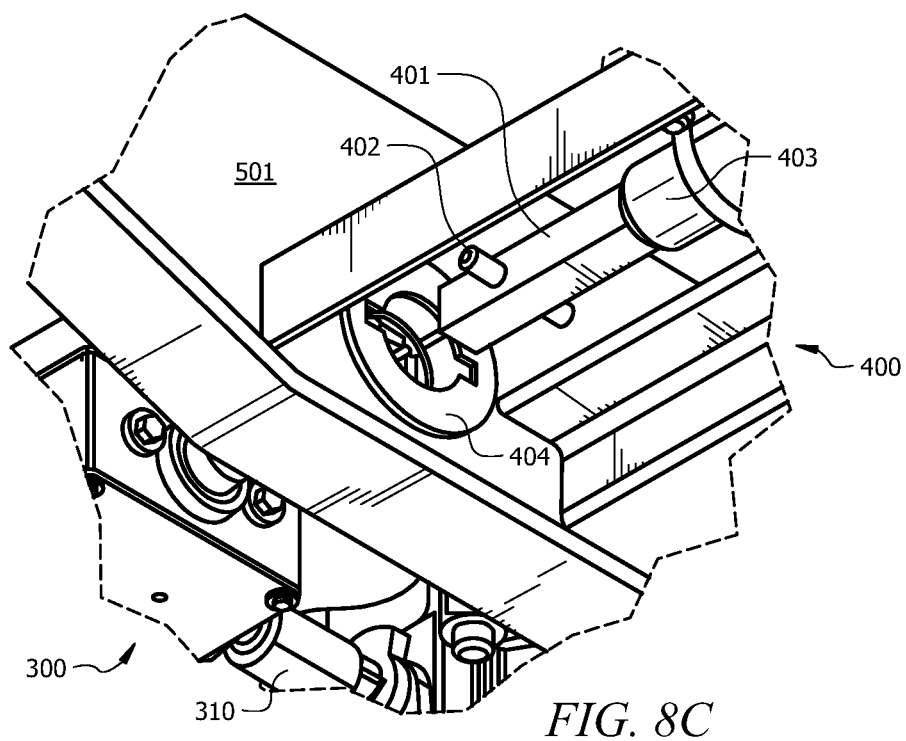
FIG. 8C is a schematic drawing illustrating a partial perspective view of an exemplary adapter assembly, according to a particular embodiment.
Figure 8D:
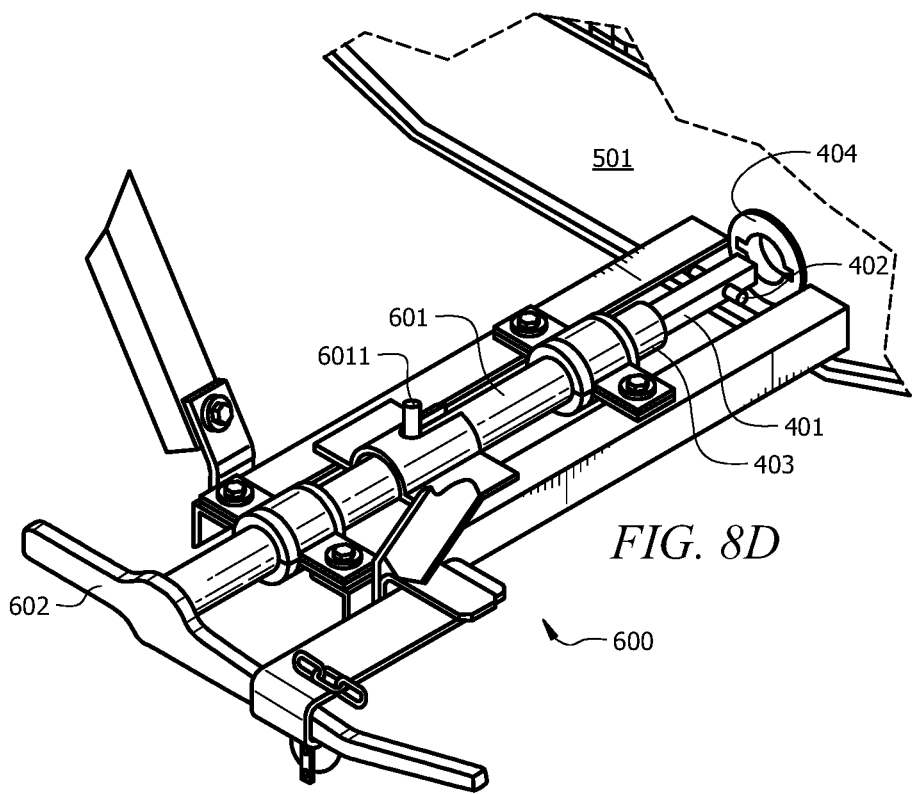
FIG. 8D is a schematic drawing illustrating another partial perspective view of an exemplary adapter assembly, according to a particular embodiment.

FIGS. 8A and 8B are schematic drawings illustrating a front view and a bottom view of the gearbox 300 with the keyed shafts 400 positioned on both sides of the gearbox 300 before an engagement to the gearbox 300, in accordance with a particular embodiment. FIG. 8C is a schematic drawing illustrating a portion of a perspective view of the keyed shaft 400 positioned before the engagement to the gearbox 300, in accordance with a particular embodiment. FIG. 8D is a schematic drawing illustrating the keyed shaft 400 and the handle assembly 600 before the engagement, in accordance with a particular embodiment. FIGS. 8A-8D generally illustrate a disengaged position of each element.

In FIG. 8A, the protruding part 3201 of the second coupler 320 is placed against the stopper 342 of the mounting channel 341 when disengaging. In FIGS. 8B and 8C, the column body 401 of the keyed shaft 400 and the second coupler 320 face the plate 404 from the opposite side of the plate 404 individually. In a particular embodiment, the protruding part 402 of the keyed shaft 400 is aligned with the opening of the plate 404. In FIG. 8D, the handle assembly 600 comprises a column body 601 having a protruding part 6011 and a handle 602. The column body 601 of the handle assembly 600 attaches to the keyed shaft 400 via the coupler 403 with one end of the column body 601. The other end of the column body 601 attaches to the handle 602 for a user to operate. The protruding part 6011 remains a first position of the handle assembly 600 on the rack of the tank before the engagement. In some embodiments, the protruding part 6011 may be a key lug configured to be kept within a locking slot on the rack of the tank. In some embodiments, the first position may be a locked position, a disengaged position or a resting position.

Figure 9:
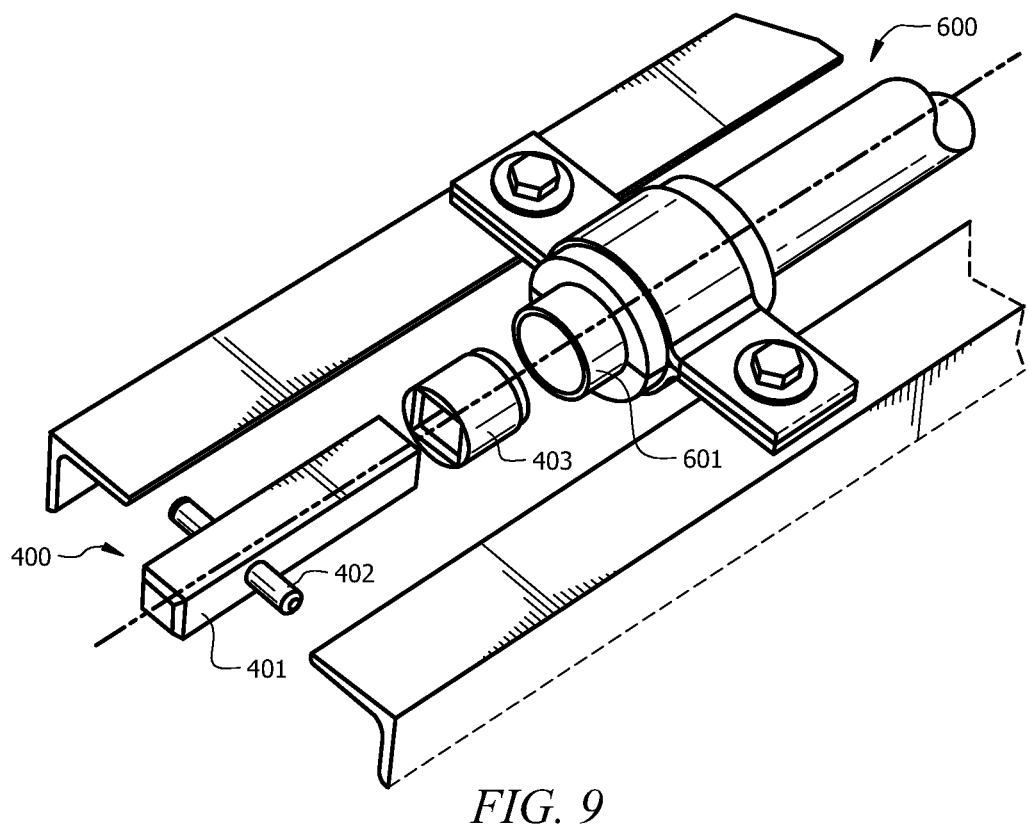
FIG. 9 is a schematic drawing illustrating a partial exploded view of an exemplary handle assembly and an exemplary keyed shaft, according to a particular embodiment.

FIG. 9 is a schematic drawing illustrating an exploded perspective view of the handle assembly 600 and the keyed shaft 400, in accordance with a particular embodiment. In FIG. 9, the coupler 403 has an opening which is sized corresponding to the column body 402. The column body 601 of the handle assembly 600 had an opening which is sized corresponding to the coupler 403. The coupler 403 of the keyed shaft 400 is configured to connect the keyed shaft 400 to the handle assembly 600.

Figure 10A:
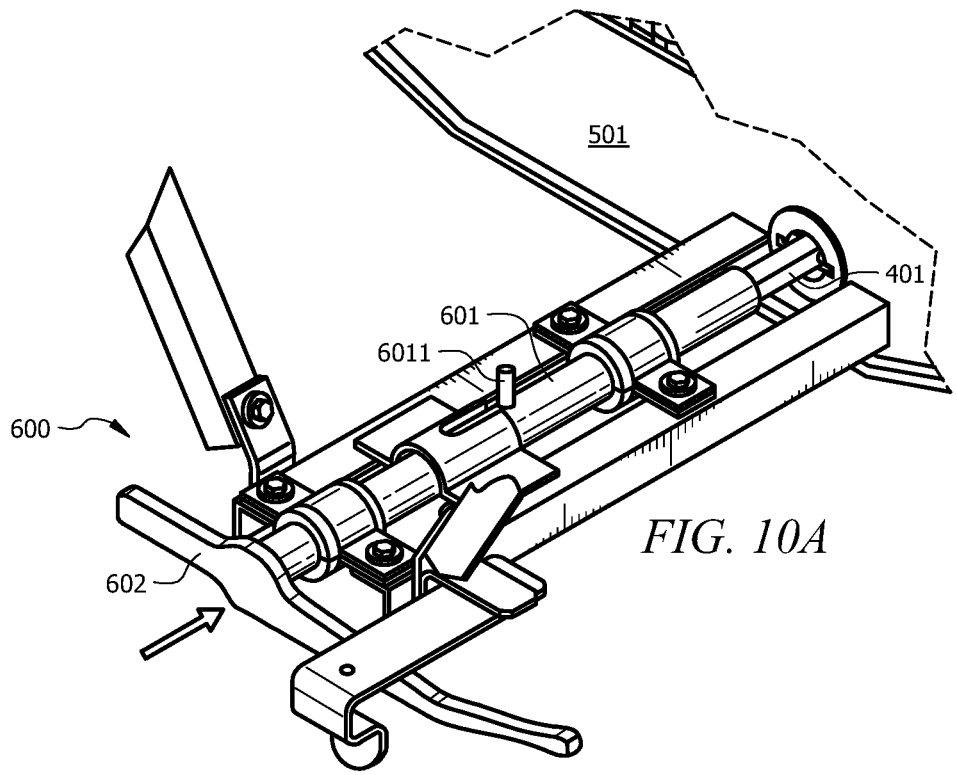
FIG. 10A is a schematic drawing illustrating a partial perspective view of an exemplary adapter assembly during operation, according to a particular embodiment.
Figure 10B:
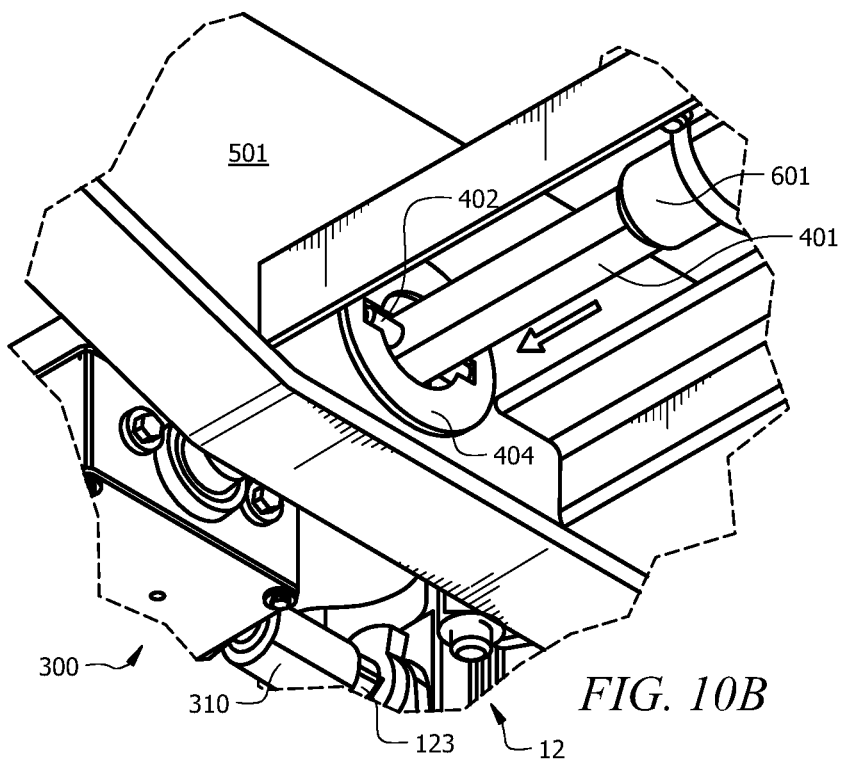
FIG. 10B is a schematic drawing illustrating a partial perspective view of the BOV and an exemplary adapter assembly during operation, according to a particular embodiment.

FIGS. 10A, 10B, 10C, and 10D are schematic drawings illustrating a first action in a series of actions to operate the stem of the BOV using the adapter assembly 200 from multiple views, in accordance with a particular embodiment. In order to operate the handle assembly, a user may push the handle 602 of the handle assembly 600 to remove the protruding part 6011 from the first position. The protruding part 402 of the keyed shaft 400 passes through the opening of the plate 404 which is mounted on the skid web 501. In FIGS. 10C and 10D, the column body 401 of the keyed shaft 400 connects to the second coupler 320 of the gearbox 300 and pushes the protruding part 3201 of the second coupler 320 to be released from the stopper 342. In certain embodiments, only one handle assembly 600 may be used to engage the gearbox 300 from one end of the second coupler 320 while the other second coupler 320 is still disengaged and locked. Therefore, it permits an independent engagement of the handle assembly 600 from either side of the railroad car.

Figure 11A:
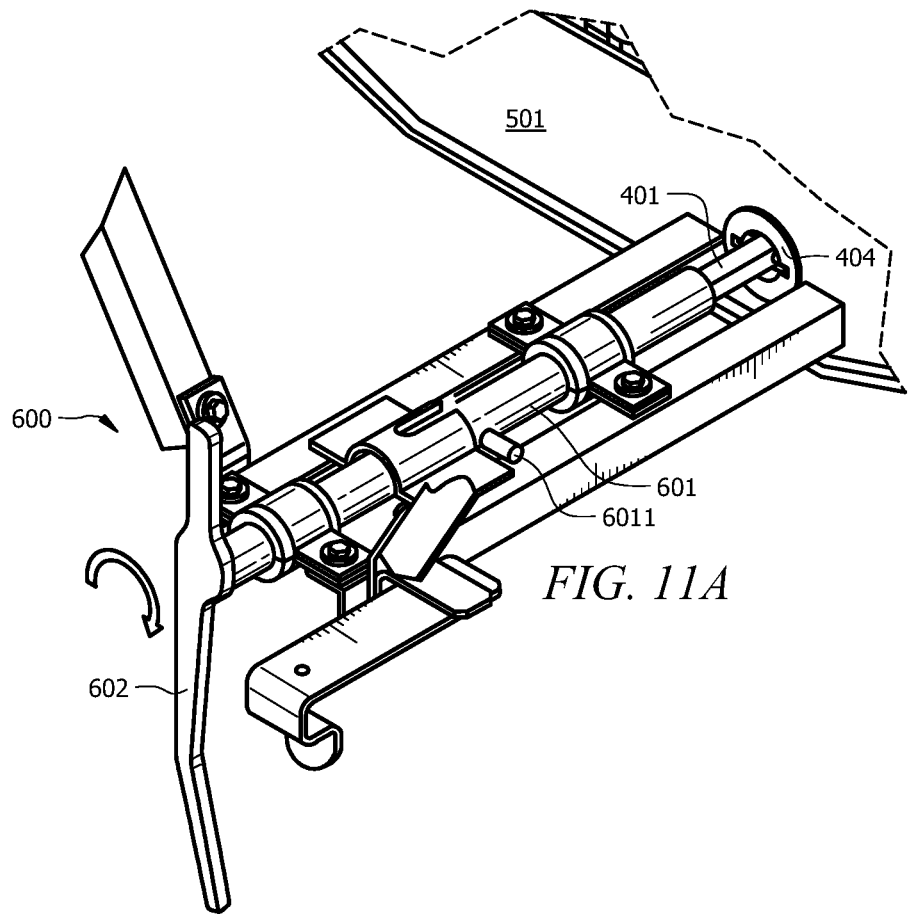
FIG. 11A is a schematic drawing illustrating a partial perspective view of an exemplary adapter assembly during operation, according to a particular embodiment.
Figure 11B:
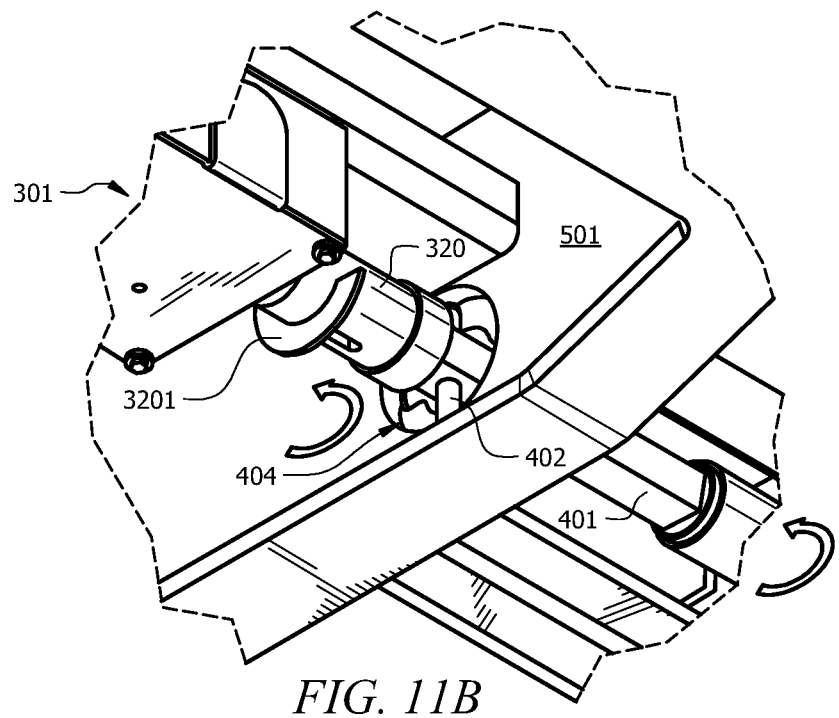
FIG. 11B is a schematic drawing illustrating a partial perspective view of an exemplary adapter assembly during operation, according to a particular embodiment.

FIGS. 11A and 11B are schematic drawings illustrating a second action in a series of actions to operate the stem of the BOV using the adapter assembly 200 from multiple views, in accordance with a particular embodiment. In FIG. 11A, the user rotates the handle 602 and translates the rotation motion to the protruding part 402 of the keyed shaft 400 to move the protruding part 402 away from the opening of the plate 404. The protruding part 402 of the keyed shaft 400 is positioned against the plate 404, and therefore the keyed shaft 400 and the handle assembly 600 are temporarily positioned in a second position from the first position. In some embodiments, the second position may be a unlocked position, a engaged position or a released position. In some embodiment, the keyed shaft 400 and the handle assembly 600 may be re-positioned from the second position to the first position.

Figure 12A:
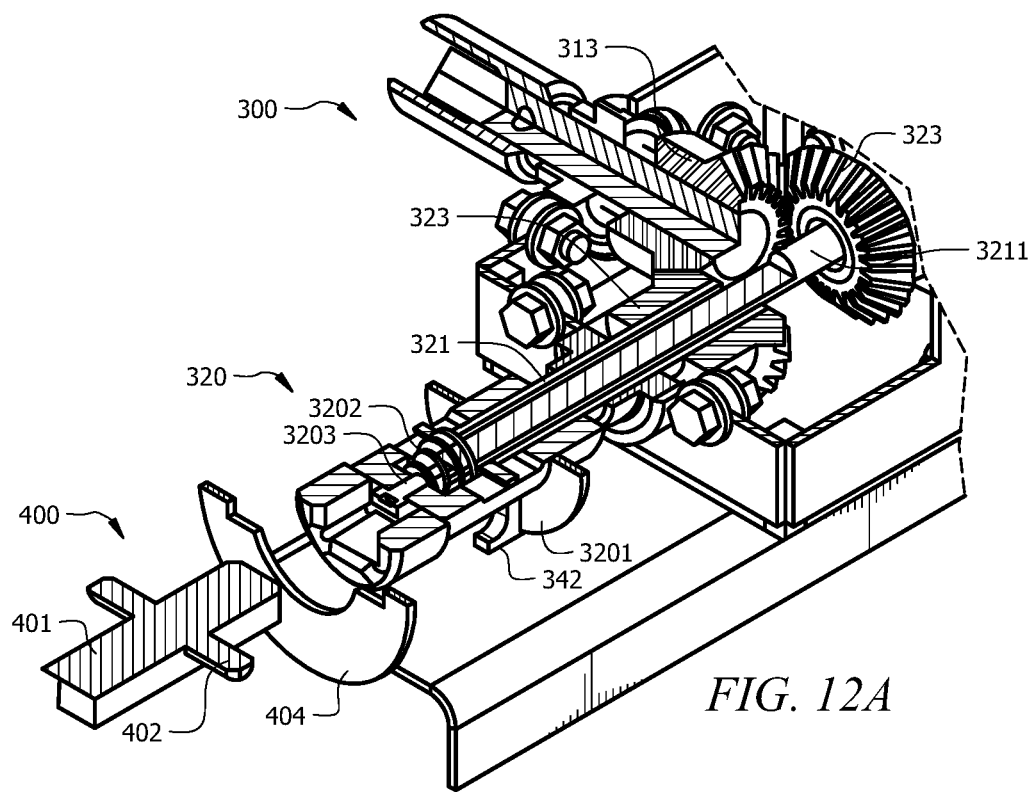
FIG. 12A is a schematic drawing illustrating a cross-sectional view of an exemplary adapter assembly during operation, according to a particular embodiment.
Figure 12B:
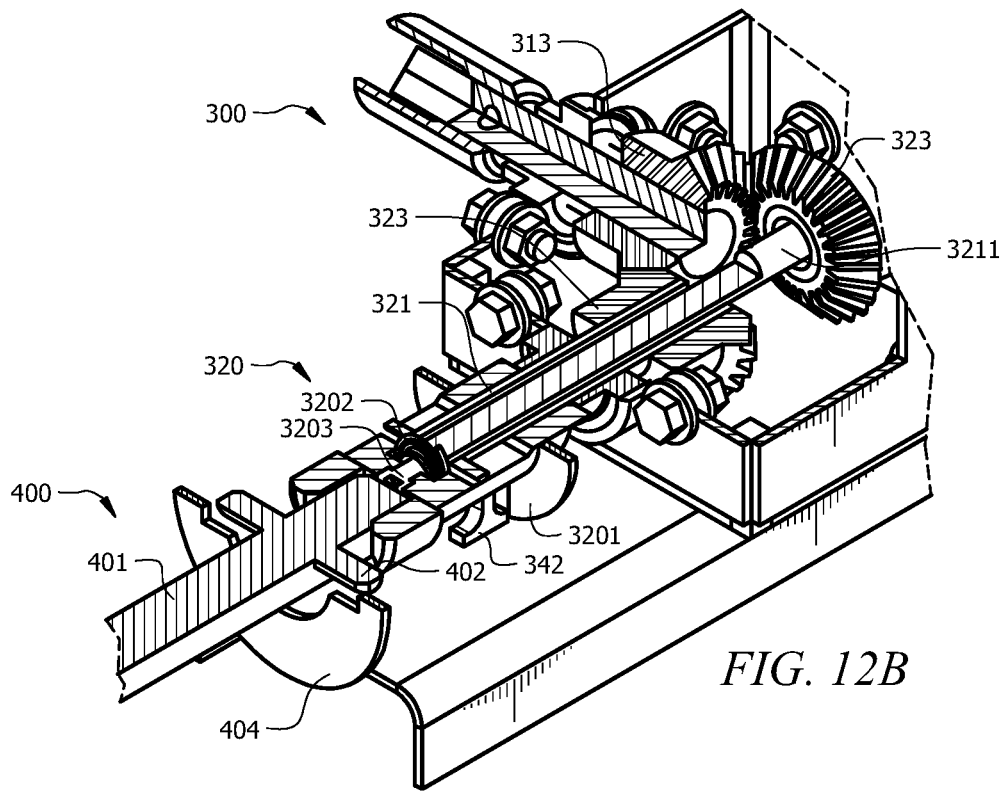
FIG. 12B is a schematic drawing illustrating a cross-sectional view of an exemplary adapter assembly during operation, according to a particular embodiment.
Figure 12C:
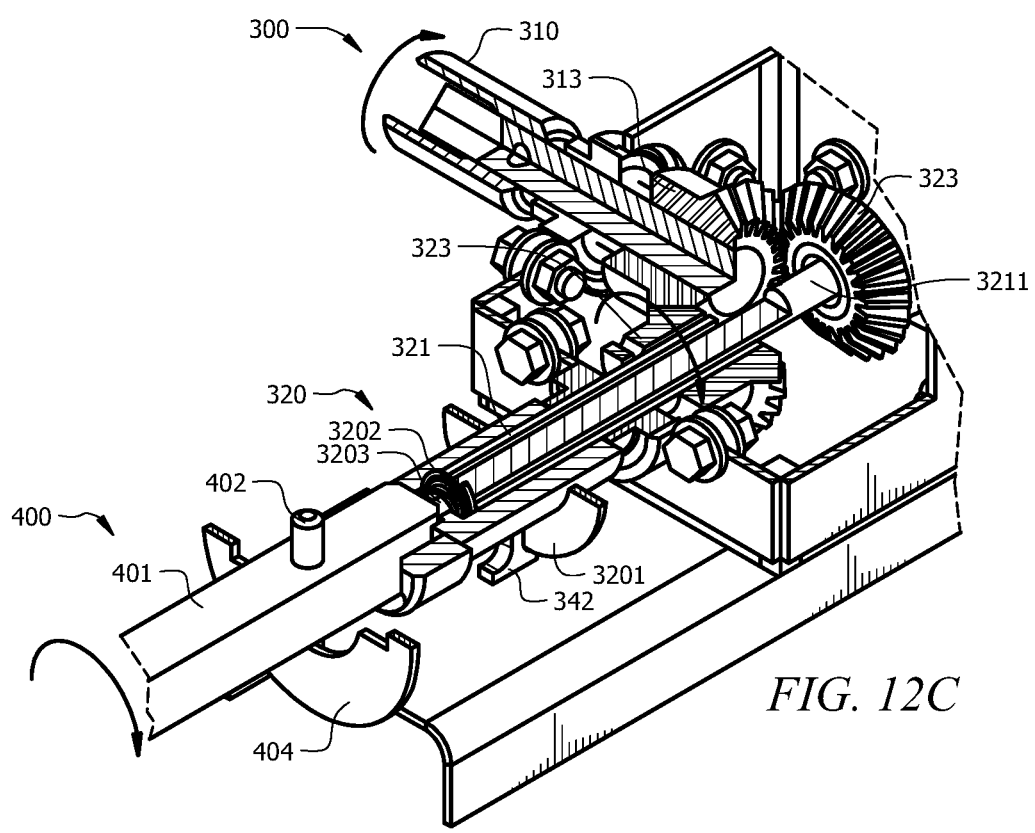
FIG. 12C is a schematic drawing illustrating a cross-sectional view of an exemplary adapter assembly during operation, according to a particular embodiment.

FIG. 12A is a schematic drawing illustrating a cross-sectional view of the gearbox 300 and the keyed shaft 400 before the engagement to the gearbox 300, in accordance with a particular embodiment. The other views of other elements before the engagement to the gearbox 300 are described with respect to FIGS. 8A-8D. FIG. 12B is a schematic drawing illustrating a cross-sectional view of the gearbox 300 and the keyed shaft 400 in the first action of a series of actions to operate the stem of the BOV using the adapter assembly 200, in accordance with a particular embodiment. The other views of other elements during the first action are described with respect to FIGS. 10A-10D. FIG. 12C is a schematic drawing illustrating a cross-sectional view of the gearbox 300 and the keyed shaft 400 in the second action of a series of actions to operate the stem of the BOV using the adapter assembly 200, in accordance with a particular embodiment. The other views of other elements during the second action are described with respect to FIGS. 11A-11B.

In FIG. 12A, the two secondary shafts 321 comprise a toggle shaft 3211 which is mounted within the two secondary shafts 321 through the gearbox 300 and connects the two second couplers 320 which are positioned on the opposite side of the gearbox 300. The toggle shaft 3211 is movable within the two secondary shafts 321. The second coupler 320 comprises a spring 3202 and a fastener 3203 inside the coupler 320. The fastener 3203 is mounted inside the second coupler 320 and attaches to the toggle shaft 3211, so that the fastener 3202 holds the spring 3202 between the end of the secondary shaft 321 and the second coupler 320 to provide a re-position of the second coupler 320. In certain embodiments, the spring 3202 may be a conical spring and the fastener 3203 may be a shaft bolt. The toggle shaft 3211 translates a linear motion from the second coupler 320 which is being depressed to the second coupler 320 on the other side which is not being depressed. Therefore, both of the protruding parts 3201 may be released from the stoppers 342 at the same time.

In FIG. 12B, the protruding part 402 of the keyed shaft 400 passes through the plate 404 and the column body 401 of the keyed shaft 400 engages to the second coupler 320. The second coupler 320 is being depressed by the keyed shaft 400 and shifted along the secondary shaft 321, so that the protruding part 3201 is released from the stopper 342. Linkagely, the fastener 3203 inside the coupler 320 is being pushed, so that the toggle shaft 3211 is shifted linearly to move the second coupler 320 on the other side to release the protruding part 3201 from the stopper 342 on the other side at the same time. The two secondary shafts 321 stays at their original positions respectively when the keyed shaft 400 is engaging to the second coupler 320.

In FIG. 12C, the keyed shaft 400 is being rotated clockwisely. In certain embodiments, the key shaft 400 may be rotated counter-clockwisely. The rotation motion translates from the handle assembly 600 operated by the user to the first coupler 310, via the keyed shaft 400, the second coupler 320, the second shaft 321, the secondary gear 323, the primary gear 313, and the primary shaft 311. Through the rotation of the first coupler 310 which attaches to the stem 123 of the BOV, the user may open or close the stem of the BOV by rotating the handle 602 of the handle assembly 600 clockwise or counter-clockwise.

Figure 13A:
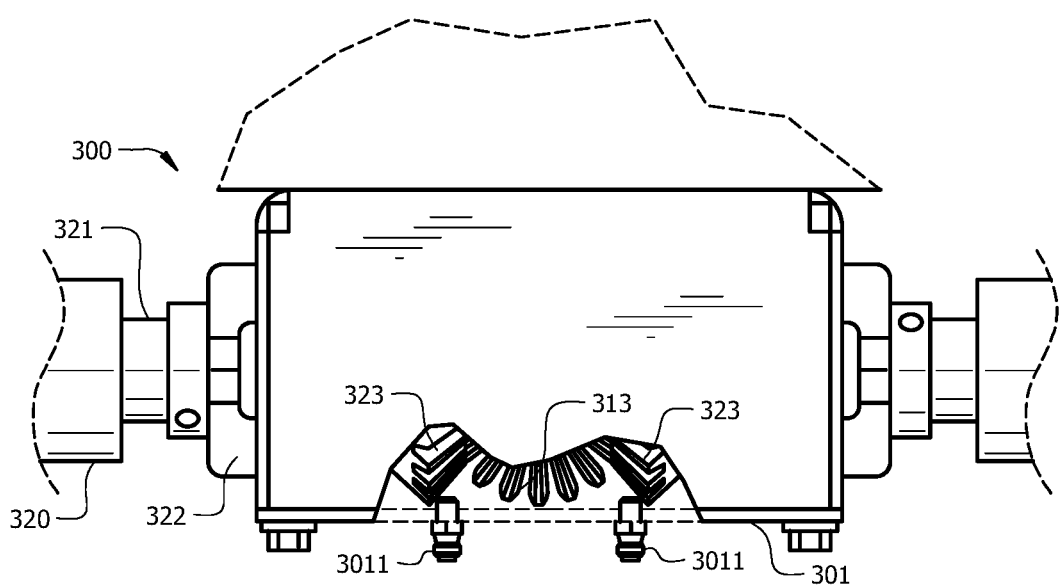
FIG. 13A is a schematic drawing illustrating a partial cutaway rear view of an exemplary gearbox, according to a particular embodiment.
Figure 13B:
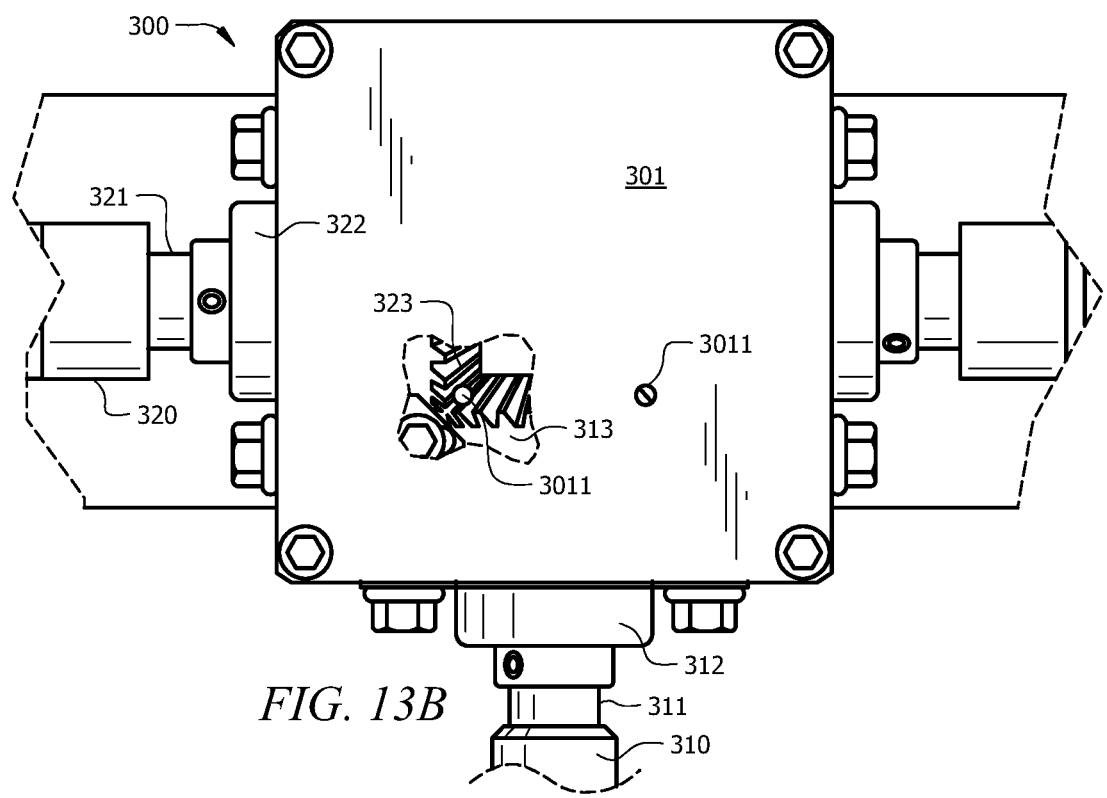
FIG. 13B is a schematic drawing illustrating a partial cutaway bottom view of an exemplary gearbox, according to a particular embodiment.

FIGS. 13A and 13 B are schematic drawings illustrating a partial cutaway view of the gearbox 300 from a rear view and a bottom view of the gearbox 300, in accordance with a particular embodiment. In FIGS. 13A and 13B, the bottom cover plate 301 has two inlets 3011 which locate in proximity to the junction of the primary gear 313 and the secondary gear 323. The inlet 3011 on the bottom cover plate 301 allows the user to add grease to the gears for lubrication readily. In certain embodiments, the inlet 3011 may be a through hole or any other means to provide the user to access the gears from the outside of the gearbox 300 for lubrication. In some embodiments, the aforementioned operations in FIG. 8A to 13B may be performed in a reverse order to close the BOV 12 and disengage the keyed shaft 400 and the handle assembly 600 into a locked position, for example, the first position.

Figure 14A:
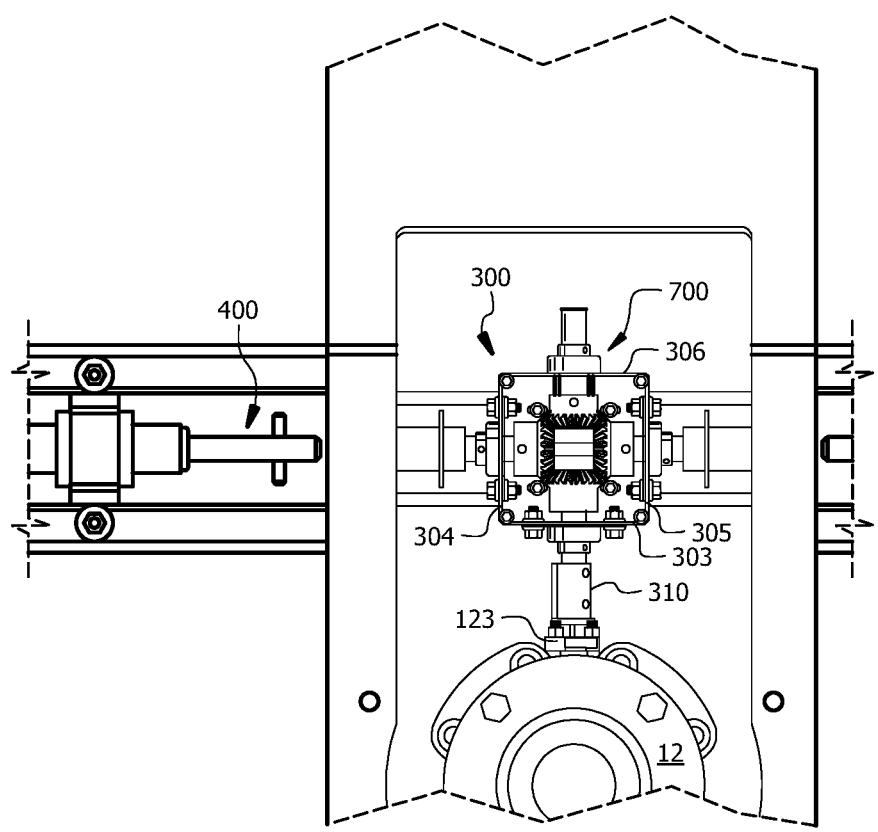
FIG. 14A is a schematic drawing illustrating a partial cutaway bottom view of an exemplary adapter assembly, according to a particular embodiment.
Figure 14B:
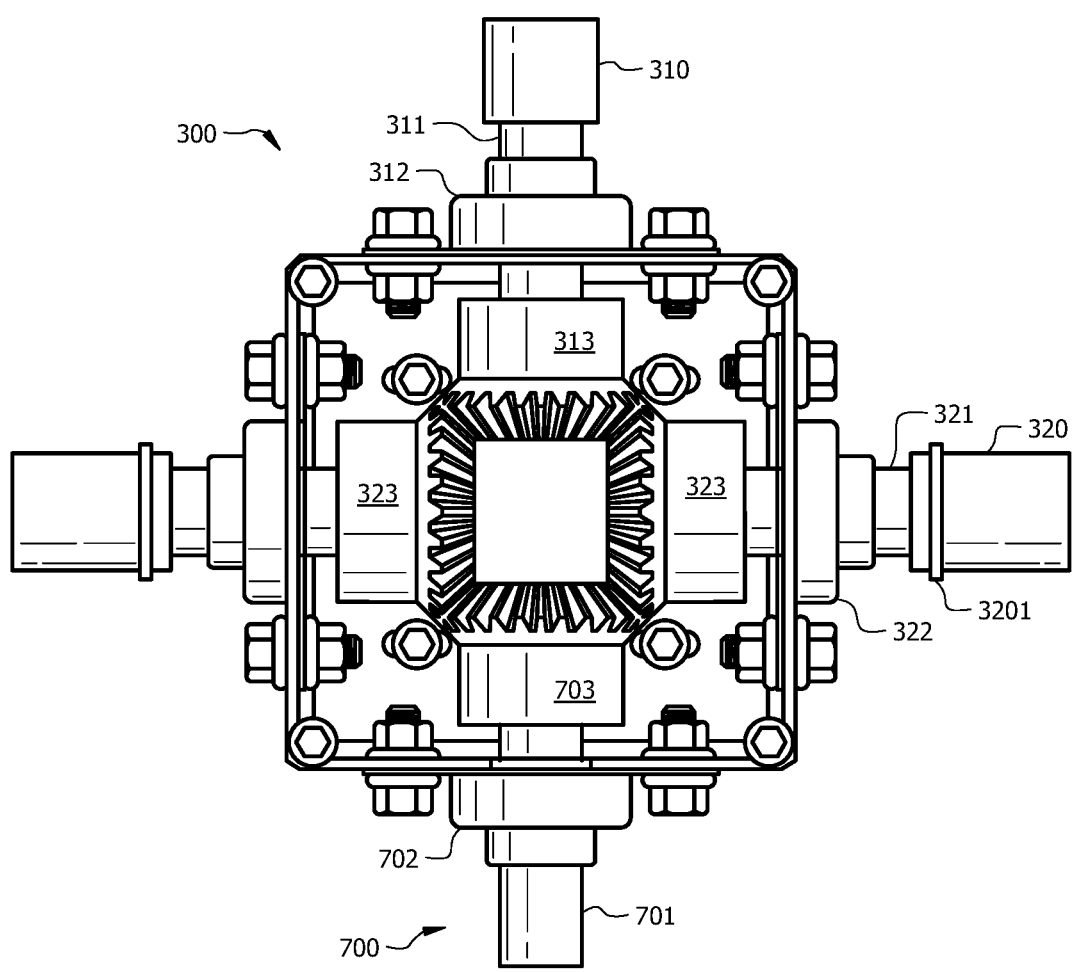
FIG. 14B is a schematic drawing illustrating a partial cutaway bottom view of an exemplary adapter assembly, according to a particular embodiment.

FIGS. 14A and 14B are schematic drawings illustrating a bottom view of the gearbox 300 with an optional idler 700, in accordance with a particular embodiment. In FIG. 14A, the idler 700 is positioned opposite to the first coupler 310 and mounted through the fourth wall 306 of the gearbox 300. In FIG. 14B, the idler 700 comprises an idler shaft 701, an idler bearing 702 and an idler gear 703. The idler shaft 701 is mounted through the fourth wall 306 rotatably using the bearing 702 and attaches to the idler gear 703 with one end of the idler shaft 701 inside the gearbox 300. The idler gear 703 is linkagely connected to the two secondary gears 323.

In some embodiments, the other end of the idler shaft 701 may be extended beyond the bearing 702 to provide an extension or an addition.

FIGS. 15A, 15B and 15C are schematic drawings illustrating various examples of the idler shaft 701, in accordance with some embodiments. In FIG. 15A, the outer end of the idler shaft 701 is shaped as a hexagonal nut 701A. In FIG. 15B, the outer end of the idler shaft 701 is shaped into a hexagon 701B. In FIG. 15C, the outer end of the idler shaft 701 is shaped into a square 701C. The exemplary idler shaft 701 is not limited to the above examples. The outer end of the idler shaft 701 may be shaped or sized into any shapes for any possible extensions. In case of emergencies, the user may operate the idler shaft 701 manually to open or close the BOV with a corresponding tool by manually disengaging the protruding part 3201 of the second coupler 320.

Figure 16B:
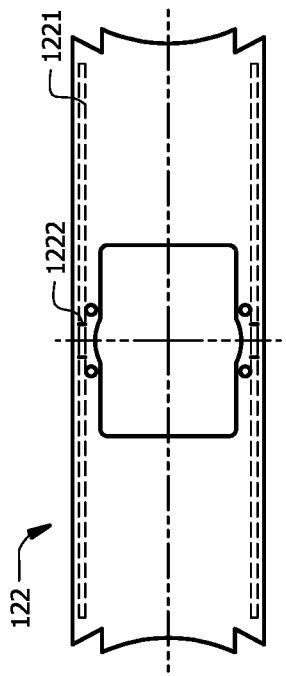
FIG. 16B is a schematic drawing illustrating a bottom view of the skid, according to the prior art.
Figure 17B:
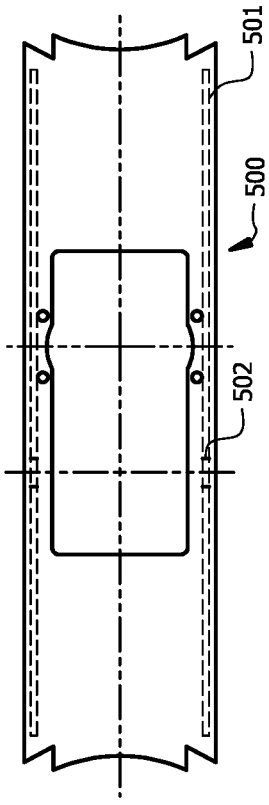
FIG. 17B is a schematic drawing illustrating a bottom view of an exemplary skid, according to a particular embodiment.
Figure 16A:
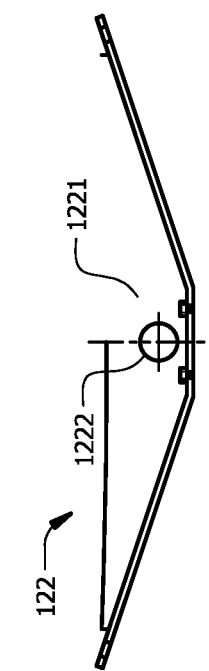
FIG. 16A is a schematic drawing illustrating a side view of a skid, according to the prior art.
Figure 17A:
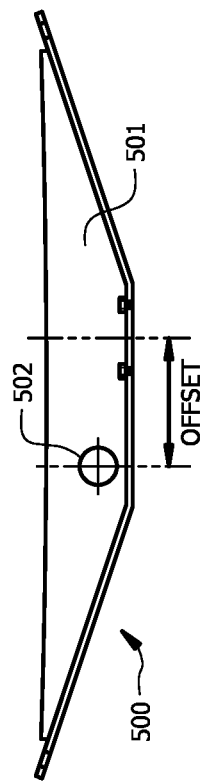
FIG. 17A is a schematic drawing illustrating a side view of an exemplary skid, according to a particular embodiment.

FIGS. 16A and 16B are schematic drawings illustrating a side view and a bottom view of the skid 122, in prior art. FIGS. 17A and 17B are schematic drawings illustrating a side view and a bottom view of the skid 500, in accordance with a particular embodiment. Comparing FIGS. 16A and 17A, the skid 500 is modified to be elongated to allow the BOV and the adapter assembly to be enclosed therein. In some embodiments, the length of the skid 500 is extending to provide a sufficient space to maintain, fabricate and operate the adapter assembly. The through hole 502 is shifted away from the cross axis of BOV. In some embodiments, the through hole 502 is offset from the cross axis the BOV or the center line of the skid 500, in order to permit the handle assembly to operate the adapter assembly through the through hole 502. Comparing to FIGS. 16B and 17B, the opening underneath the skid 500 is also elongated to allow the user to readily operate or maintain the BOV and the adapter assembly. In some embodiment, the opening of the skid 500 may be a cutout.

Particular embodiments of the present disclosure may provide numerous technical advantages. For example, particular embodiments may improve the efficiency of unloading liquids from the tank by using the adapter assembly from both lateral sides of the railroad car to open or close the BOV. Furthermore, providing the capability of operating the BOV from both lateral sides of the tank may reduce the danger of an operator getting injured from traveling around or under the railroad car. In addition, the adapter assembly in the present disclosure does not occur extra cost to install an extra stem which might increase the risk of leaking.

Although particular embodiments and their advantages have been described in detail, it should be understood that various changes, substitutions and alternations can be made herein without departing from the spirit and scope of the embodiments. Particular embodiments of the present disclosure described herein may be used or mounted for a railroad car, a tank, or any other containers which may be used to keep or transport liquid cargo.

The invention claimed is:

1. An adapter assembly for a bottom outlet valve of a railroad car comprising:
    a coupler configured to couple to a stem of the bottom outlet valve of the railroad car, the coupler extending along a longitudinal axis of the railroad car when the coupler is coupled to the stem, the coupler configured to rotate about the longitudinal axis to open the bottom outlet valve when the coupler is coupled to the stem; and
    a primary gear coupled to the coupler, the primary gear configured to couple to a handle assembly extending from either side of the railroad car, the handle assembly configured to turn the primary gear to rotate the coupler about the longitudinal axis to open the bottom outlet valve.

2. The adapter assembly of claim 1, further comprising:
two secondary gears coupled to the primary gear; and
two shafts aligned generally perpendicular to the longitudinal axis of the railroad car, wherein each of the two shafts is coupled to a respective one of the two secondary gears, wherein the handle assembly is configured to be coupled to either of the two shafts.

3. The adapter assembly of claim 2, further comprising:
an idler gear coupled to at least one of the two secondary gears; and
an idler shaft configured to be coupled to the idler gear, wherein the idler shaft is configured to be coupled to a tool.

4. The adapter assembly of claim 1, wherein the handle assembly comprises a handle assembly gear which is configured to operate the primary gear.

5. The adapter assembly of claim 1, wherein the adapter assembly further comprises a skid which is configured to at least partially cover the coupler.

6. An adapter assembly for a bottom outlet valve of a railroad car comprising:
a coupler configured to couple to a stem of the bottom outlet valve of the railroad car, the stem of the bottom outlet valve is aligned generally with a longitudinal axis of the railroad car, the coupler extending along the longitudinal axis of the railroad car when the coupler is coupled to the stem, the coupler configured to rotate about the longitudinal axis to open the bottom outlet valve when the coupler is coupled to the stem; and
a primary gear coupled to the coupler, the primary gear is configured to couple to a handle assembly extending from either side of the railroad car, the handle assembly configured to turn the primary gear to rotate the coupler about the longitudinal axis to open the bottom outlet valve.

7. The adapter assembly of claim 6, further comprising: wherein the apparatus further comprises:
two secondary gears coupled to the primary gear, wherein the two secondary gears are placed opposite to each other; and
two shafts aligned generally perpendicular to the longitudinal axis of the railroad car, wherein each of the two shafts is coupled to a respective one of the two secondary gears, wherein the handle assembly is configured to be coupled to either of the two shafts.

8. The adapter assembly of claim 7, further comprising:
an idler gear coupled to at least one of the two secondary gears; and
an idler shaft configured to be coupled to the idler gear, wherein the idler shaft is shaped to be coupled to a tool.

9. The adapter assembly of claim 6, wherein the handle assembly comprises a handle assembly gear which is configured to operate the primary gear.

10. The adapter assembly of claim 6, wherein the adapter assembly further comprises a skid which is configured to at least partially cover the coupler.

11. A method for coupling an adapter assembly to a bottom outlet valve comprising:
mounting the bottom outlet valve underneath a subject;
aligning a stem of the bottom outlet valve generally with a longitudinal axis of the subject; and
coupling an adapter assembly to the bottom outlet valve, wherein the adapter assembly comprises:
a coupler configured to couple to the stem of the bottom outlet valve, the coupler extending along the longitudinal axis of the subject when the coupler is coupled to the stem, the coupler configured to rotate about the longitudinal axis to open the bottom outlet valve when the coupler is coupled to the stem; and;
a primary gear coupled to the coupler, the primary gear configured to couple to a handle assembly extending from either side of the subject, the handle assembly configured to turn the primary gear to rotate the coupler about the longitudinal axis to open the bottom outlet valve.

12. The method of claim 11, wherein the adapter assembly further comprises:
two secondary gears coupled to the primary gear; and
two shafts aligned generally perpendicular to the longitudinal axis of the subject, wherein each of the two shafts is coupled to a respective one of the two secondary gears, wherein the handle assembly is configured to be coupled to either of the two shafts.

13. The method of claim 12, wherein the adapter assembly further comprises:
an idler gear coupled to at least one of the two secondary gears; and
an idler shaft configured to be coupled to the idler gear, wherein the idler shaft is configured to be coupled to a tool.

14. The method of claim 11, wherein the handle assembly comprises a handle assembly gear which is configured to operate the primary gear.

15. The method of claim 11, wherein the adapter assembly further comprises a skid which is configured to at least partially cover the coupler.

* * * * *